US006487028B1

(12) United States Patent
Sri-Jayantha et al.

(10) Patent No.: US 6,487,028 B1
(45) Date of Patent: *Nov. 26, 2002

(54) SERVO SYSTEM FOR DISK-FLUTTER IN ROTATING STORAGE SYSTEMS

(75) Inventors: S. M. Sri-Jayantha, Ossining, NY (US); Hien Dang, Nanuet, NY (US); Arun Sharma, New Rochelle, NY (US); Kiyoshi Satoh, Fujisawa (JP); Tetsuo Ueda, Sagamihara (JP); Hideki Ohzeki, Yokohama (JP); Nayouki Kagami, Fujisawa (JP); Kiochi Takeuchi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/275,952

(22) Filed: Mar. 25, 1999

(51) Int. Cl.⁷ .............................. G11B 5/02; G11B 5/596
(52) U.S. Cl. ...................................... 360/25; 360/77.04
(58) Field of Search ........................... 360/25, 69, 77.04

(56) References Cited

U.S. PATENT DOCUMENTS

| 4,430,675 | A | * | 2/1984 | Fujime ........................ 358/342 |
| 4,535,368 | A | * | 8/1985 | Schwartz et al. ............. 360/28 |
| 4,583,213 | A | | 4/1986 | Bracken et al. |
| 5,189,578 | A | | 2/1993 | Mori |
| 5,485,443 | A | * | 1/1996 | Niwayama .................... 369/54 |
| 5,608,586 | A | * | 3/1997 | Sri-Jayanatha et al. |
| 5,657,188 | A | | 8/1997 | Jurgenson et al. |
| 5,712,014 | A | | 1/1998 | Carden ........................ 428/65.6 |
| 5,948,495 | A | | 9/1999 | Stanish et al. ............. 428/64.1 |
| 6,088,187 | A | * | 7/2000 | Takaishi .................. 360/78.05 |
| 6,130,792 | A | * | 10/2000 | Goker ......................... 360/48 |
| 6,339,512 | B1 | * | 1/2002 | Sri-Jayanatha et al. .. 360/77.04 |

* cited by examiner

*Primary Examiner*—Regina N. Holder
(74) *Attorney, Agent, or Firm*—Fleit, Kain, Gibbons, Gutman & Bongini P.L.; Michael J. Buchenhorner; Casey P. August

(57) ABSTRACT

In order to handle platter flutter in a hard disk operated at high speed (e.g. 10,000 RPM) and maintain tracking of read/write head, peak filters are added to a head tracking servo feedback loop. In some embodiments, several lag-lead type peak filters centered at a plurality of flutter mode frequencies are provided to process a Position Error Signal (PES) read from the read/write head. The several filter are preferably arranged in series (i.e. to operate on the PES sequentially), alternatively the filters can be arranged in parallel. Phase lags and leads caused by the several filters partially cancel at frequencies intermediate center frequencies of the several filters. According to another embodiment two or more, preferably three narrow band filters are used to cover the spectrum of each flutter mode. In a configuration mode, a spectrum of the flutter modes can be obtained and used to set the center frequencies, and bandwidths of filters used to filter out the flutter modes.

25 Claims, 23 Drawing Sheets

SERVO SYSTEM FOR DISK-FLUTTER IN ROTATING STORAGE SYSTEMS

CROSS-REFERENCE TO RELATED APPLICATIONS

Not applicable

BACKGROUND OF THE INVENTION

1. Field of the Invention

The invention disclosed broadly relates to data storage devices. More particularly, the present invention relates to techniques for correcting the adverse effects of vibrations on servo systems in data storage devices.

2. Description of the Related Art

Hard disk drives are commonly used for mass storage purposes in computers. In FIG. 1 there is shown a block diagram of the major electro-mechanical components of a disk drive 102. The disk drive 102 has a read/write transducer 104, voice coil actuator 106, recording medium or disk 108, and read/write control electronics 110. There is a constant demand for increase storage capacity and reduced disk access times as new software and new applications become available. The present generation of hard disk drives 102 are designed to operate in a portable, a desk-top and a server environment. In order to meet the demand for lower disk access times, the spindle rotation speed for disk 108 has been on the increase. However this increase in spindle rotation speed has present substantial design challenges to overcome.

These design challenges can be categorized based on their source and the directional effects on the read/write transducer 104. The first problem is vibration which is caused from mass imbalances, physical tolerance limitations and electro-mechanical sources. The vibration manifests itself by moving the read/write transducer 104 back and forth in a direction parallel to the surface of the disk 108. The typical sources of vibration include the disk drive itself, other disk drives and other electro-mechanical drives sharing a chassis such as CD ROM drives, diskette drives, and tape drive devices. Vibration produces poor settle out and/or reduces track following characteristics, especially for track densities of 10,000 tracks per inch (TPI) and beyond. Servo systems reduce the track-follow error by about 20 to 30 dB using basic servo loop error rejection properties. Another technique for reducing the effects of vibration is disclosed in application Ser. No. 08/119,181 by S. M. Sri-Jayantha et al. entitled "Adaptive Vibration Control For Servo Systems In Data Storage Devices" filed on Jul., 20, 1998 and is commonly assigned herewith to IBM.

The second problem is flutter of the disk platter 108. The flutter is the movement of the disk 108 that causes track mis-registration error (TMR). Disk-flutter, is primarily caused by pressure fluctuations associated with internal turbulent airflow. The airflow is the result of aerodynamic effects between the fast rotating surface of the disk 108 causing air to disturb the close flying read/write transducer 104. As the rotating speed of a disk is increased from 5,400 rpm to 10,000 rpm, the aerodynamically induced disk-flutter becomes a major contributor to track mis-registration error. The track density of present generation drive is about 15,000 TPI. About 30% of the TMR budget is consumed by disk-flutter effects at disk speeds 7,200 rpm in a disk drive with conventional servo-mechanics configuration. As track density is increased, the disk-flutter-based TMR is expected to contribute well above 30% of the allowed TMR budget unless a cost effective solution is found.

The impact of disk-flutter on TMR can be minimized by aerodynamic redesign of the base-plate, improved stiffness and damping of disk platter substrate, or by novel servo method. Present 3.5" disk drives have reached the TMR limit posed by the disk-flutter mechanics. Disk-flutter has been observed in the high track density 3.5" products. The disk-flutter problem can be tackled from three technical viewpoints: mechanical, aerodynamic, and servo.

A higher bandwidth servo system can effectively compensate for the disk-flutter, but no cost effective methodology has been proposed by the storage industry to increase the servo bandwidth without increasing the component count. The strength of the airflow disturbance can be reduced by means of shrouding. However, complex shrouding or machining operations makes the mechanical approach not economical. Moreover, the shrouding must be custom designed for each type and model of hard disk drive 102. One approach can be found in the prior art has been to reduce airflow disturbance in the disk enclosure is in U.S. Pat. No. 4,583,213 by Allen T. Bracken et al. for "Air shroud for data storage disks", issued Apr. 15, 1986. Accordingly, a need exists to reduce fluttering in disk drives without the need of redesigning custom shrouding or custom base plates.

Another approach to reduce disk-flutter is by use of an alternate disk platter substrate with increased stiffness and damping properties. However, new substrates call for investments in research and development. Therefore, a need exists for a method and apparatus to reduce the effects of disk-fluttering TMR without the need of new disk substrates.

Still another approach to reduce disk-flutter problems is to use smaller diameter disk drives. Due to the lack of cost effective solutions for larger diameter hard disks, the storage industry has moved towards 3.0" and 2.5" diameter disks to minimize the severity of disk-flutter problems. The effect of mechanical movement of the data tracks due to disk-flutter can be effectively track-followed by increasing the servo bandwidth of a head positioning system. Using micro actuators the bandwidth of a conventional head positioning system can be increased. Examples of micro actuators are found in U.S. Pat. No. 5,657,188 by Ryan Jurgenson et al. for "Head suspension with tracking microactuator" issued Aug. 12, 1997 and U.S. Pat. No. 5,189,578 by Kenji Mori for "Disk system with sub-actuators for fine head displacement" issued Feb. 23, 1993. But using micro actuators can add cost to the servo assembly. Accordingly, a need exists to reduce the effect of disk-fluttering TMR without the need to reduce the diameter of the disk and the need to use new forms of disk actuators.

SUMMARY OF THE INVENTION

Briefly, in accordance with the present invention, a rotating media storage system comprising: a servo feedback loop for providing a position error signal to position read/write transducer over a rotating media storage; a detector for detecting at least one of the disk-flutter modes induced on the transducer and a narrow band filter is set to servo compensate the fundamental mode of at least one flutter mode.

In another embodiment, the disk-flutter mode is minimized using a lead-lag filter which reduces the amplification of the disk-flutter in the flutter enhancement zone.

In accordance with another embodiment of the present invention, a method that corresponds to the above rotating media storage system is disclosed.

BRIEF DESCRIPTION OF THE DRAWINGS

FIGS. 3b–f are time domain plots of the five different peaks for each flutter mode of the PES signal in FIG. 3 as filtered through a 6 dB second order digital peak filter tuned for each frequency.

DETAILED DESCRIPTION OF AN EMBODIMENT

This description is divided into two section. The first section describes how the disk-flutter modes can be captured and analyzed for a specific hard disk 2. The second section describes how the disk-flutter filtering is constructed to minimize the effects of the disk-flutter modes in the first section. The drawings referred to throughout this specification, use like numeral to refer to like parts throughout several views.

A. Disk-Flutter Mode Measurement and Analysis

Figure 1:
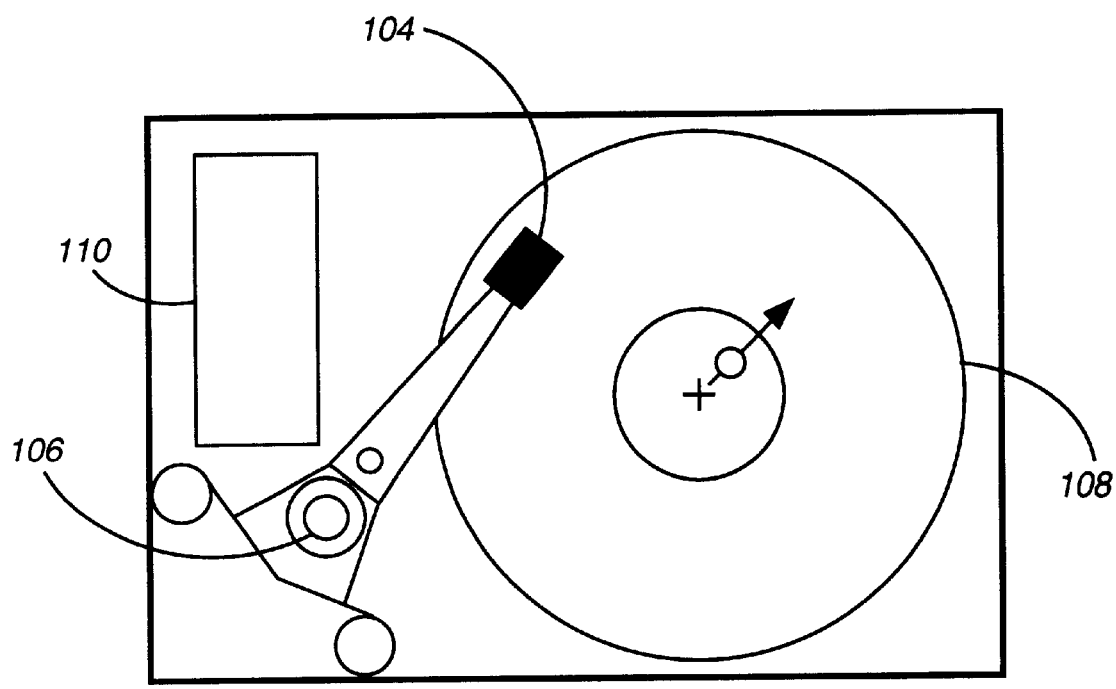
FIG. 1 is a block diagram of the major electro-mechanical components of a disk drive.
Figure 2:
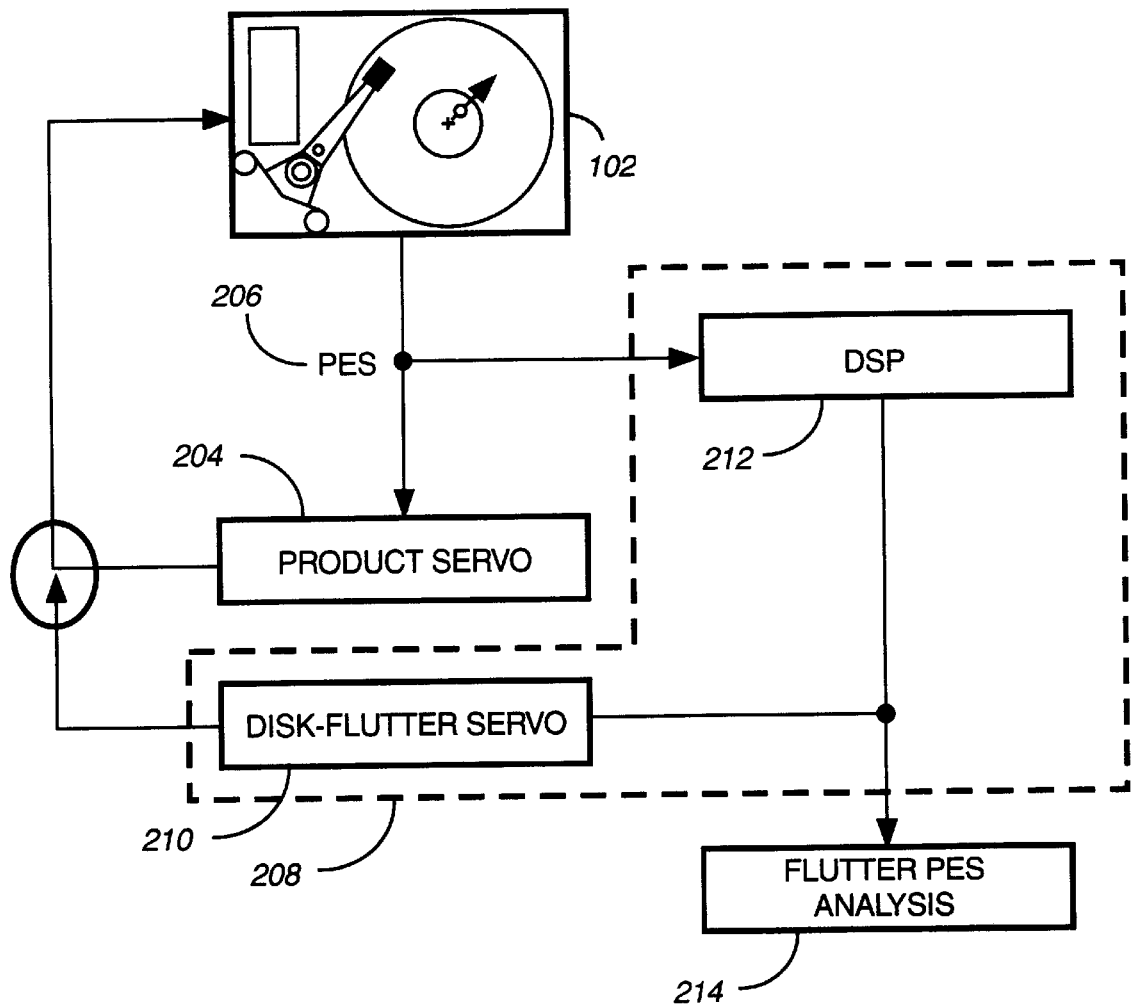
FIG. 2 is a block diagram of the disk drive in FIG. 1 with the servo system tools used to evaluate and implement the disk-flutter servo according to the present invention.

FIG. 2 is a block diagram of the disk drive in FIG. 1 with a servo system tools used to evaluate and implement the disk-flutter servo according to the present invention. The disk-flutter tool consists of two parallel independent servo loops. The first servo loop is a product servo feedback loop 204 which is typically part of the control electronics 110 for the servo actuator 202. A position error signal (PES) 206 is read from the servo actuator 202. Following servo principles known in the art, the PES 206 is used to correct and compensate for the position of the actuator 202. The first servo loops allows the control electronics 110 to operate without any external support, but the PES 206 can be read into a separate digital signal processor in real time for data analysis purposes. The second servo loop also is feed by the same PES 206. The disk-flutter servo 208 is shown in two sections, a DSP (digital signal processor) section 212 and a disk-flutter servo section 210. The disk-flutter servo 208 can accurately replicate the transform and filter characteristics of the product servo 204 so as to take the product servo 204 out of the loop during analysis if desired. The DSP section 212 can be used for analysis only or in conjunction with the disk flutter servo section 210 to form a complete disk flutter servo 210 to replace the product servo 204. The second servo loop allows custom implementation of a novel servo using the same identical PES stream while the product servo loop 204 is disabled. By means of this setup, a strict comparison between conventional servo performance and novel servo performance can be made on the identical hardware for disk drive 102. A DSP algorithm residing in DSP 210 provides the ability to implement a variety of narrow-band digital filters tuned at a given frequency so that the time domain characteristics of the individual disk-flutter induced PES component can be analyzed. The following plots are obtained using the PES signal 206 displayed on spectral equalizer 214.

Figure 3A:
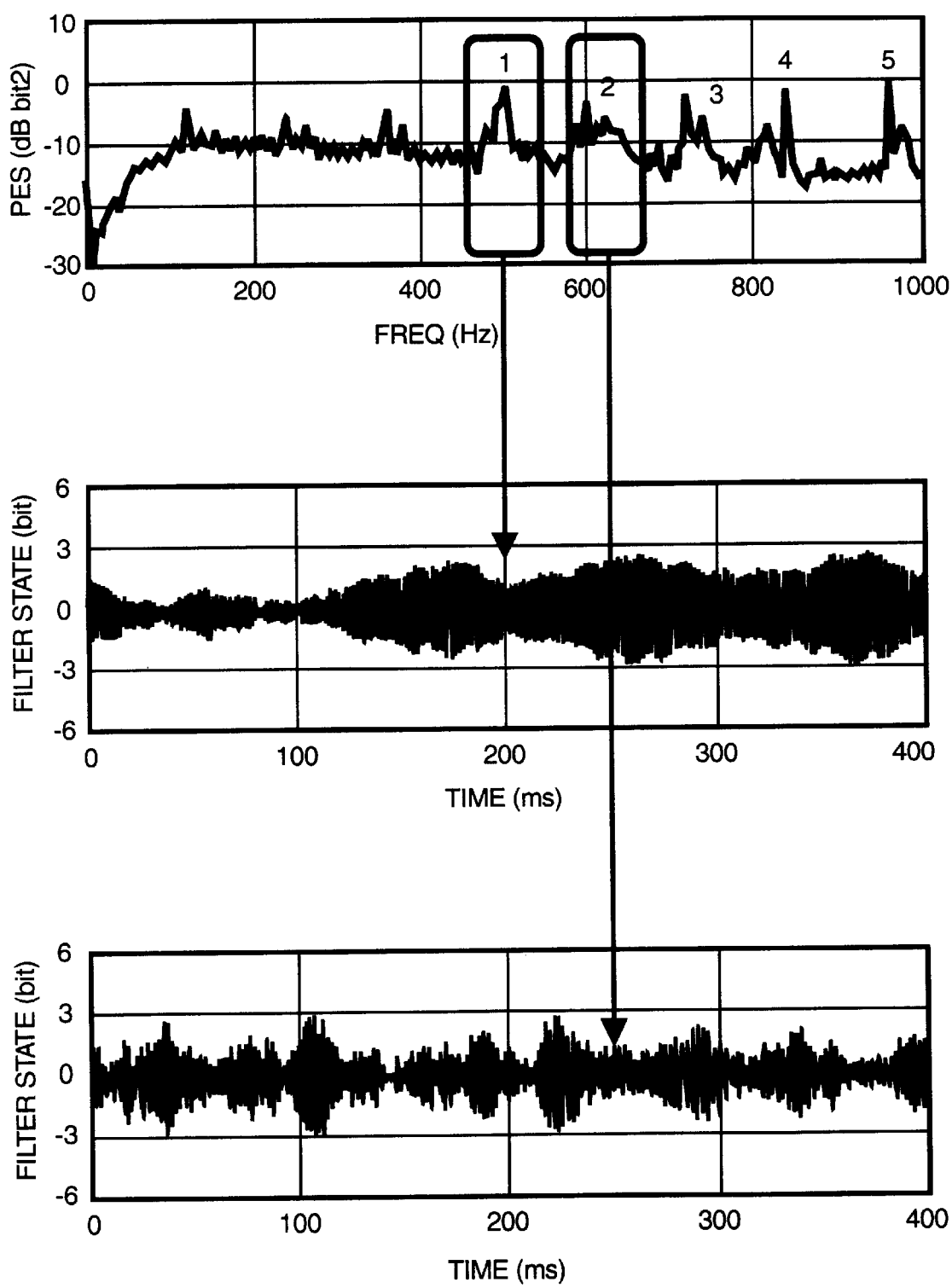
FIG. 3a is a frequency domain plot of the PES power spectrum including peaks of five disk-flutter modes peaks using the servo tools of FIG. 2 with the product servo on according to the present invention.
Figure 3B:
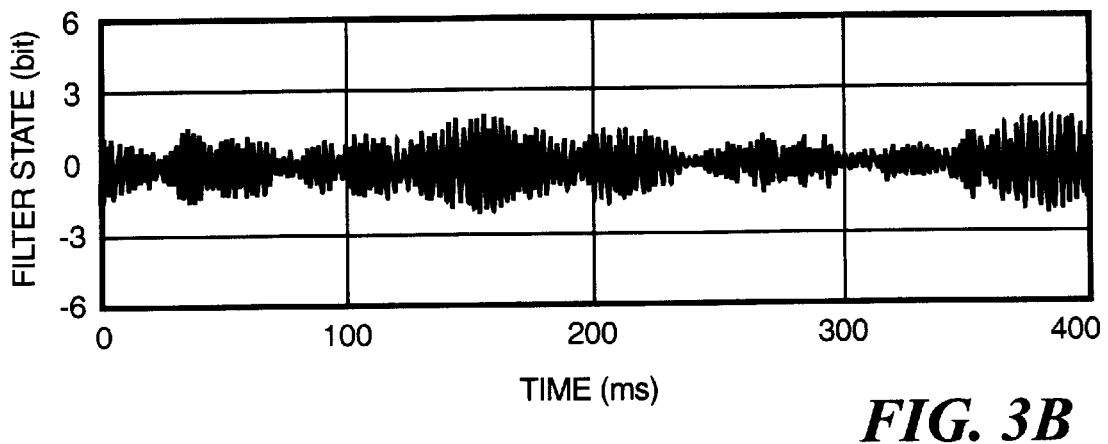
Figure 3C:
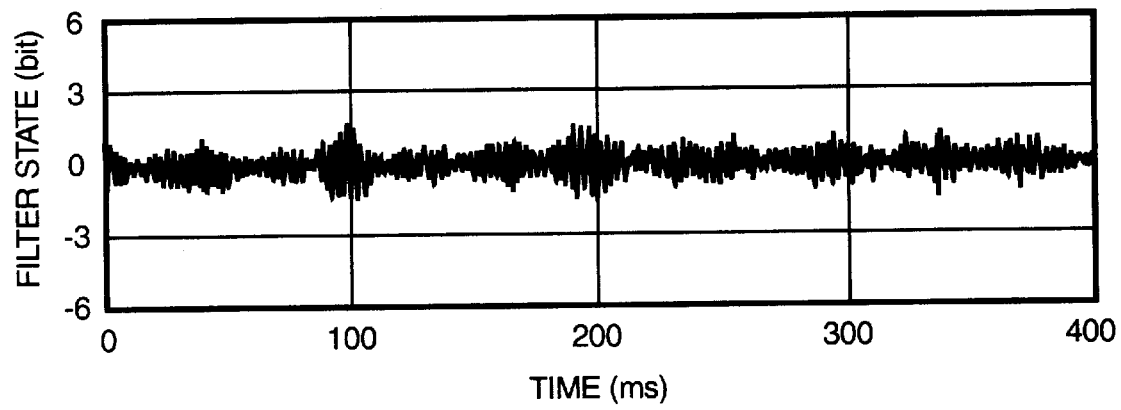
Figure 3D:
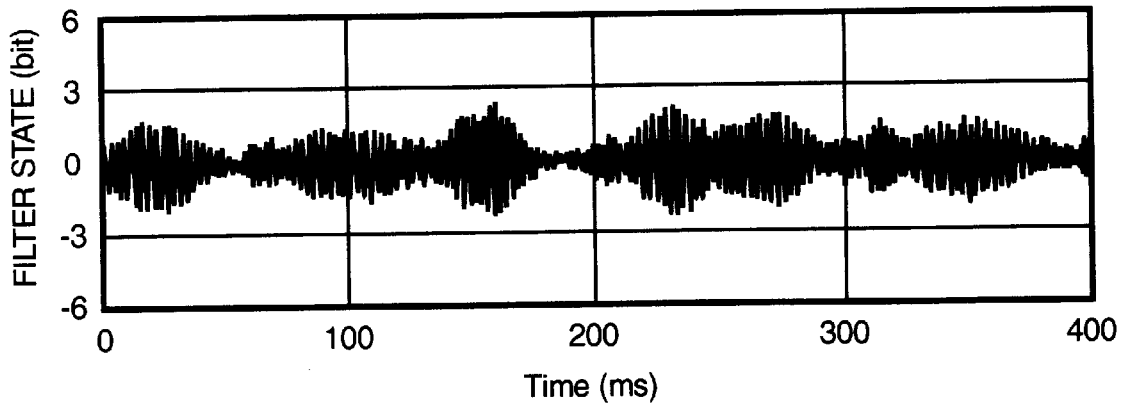

FIG. 3a. is a frequency domain plot of the PES power spectrum of peaks for five disk-flutter modes using the servo tools of FIG. 2 with the disk flutter servo on, according to the present invention. The Y-axis represents the PES spectrum in bits squared. One track width of hard disk platter 108 is equal to an 8 bit word. Therefore, there are $2^8$ or 256 bits equal to one track width. The graphs are normalized so that there are +/1 127 bits centered around a center line of Zero. The hard disk has a several significant flutter modes. Five significant flutter modes at 501 Hz, 617 Hz, 737 Hz, 829 Hz and 980 Hz are shown in FIG. 3a. These flutter modes are labeled 1 through 5 with the flutter modes 1 and 2 highlighted for emphasis by a box 302. FIGS. 3b–f depict time domain plots of the five different peaks for each disk-flutter mode of the PES signal in FIG. 3 as filtered through a 6 dB second order digital peak filter tuned for each frequency. Filters with higher order filters may be used for this disk-flutter analysis that would more clearly demarcate disk-flutter peaks, but the second order filters are throughout this description for simplicity. Conventionally, the flutter data is viewed in a frequency domain as shown in FIG. 3a, where the five spectral peaks at 501 Hz, 517 Hz, 737 Hz, 820 Hz and 980 Hz have about 50 Hz spectrum spread. Because of this broad spectral characteristics as shown in the frequency domain, a broad filter would produce excessive phase losses in the product servo-loop 204 thus causing instability or degradation in TMR. The significance of the time domain data in FIGS. 3b–3f is that it is amplitude modulated. Even though the disk-flutter components do not have a steady amplitude a detail analysis shows that the frequency of each flutter mode is stable and does not shift substantially under constant operating temperature, this is detailed further in FIGS. 4a–b below. Therefore the fundamental frequency component of flutter TMR can be servo compensated, regardless of the amplitude modulation that causes the broadening of the frequency spectrum, by a relatively narrow band filter with its peak frequency selected to match that of each disk-flutter component. A more detail discussion, below in Section B "Disk-Flutter Servo Construction" is provided to distinguish the amplitude modulation behavior of each flutter-component and additional opportunities available to enhance the disk-flutter servo 208.

Figure 4A:
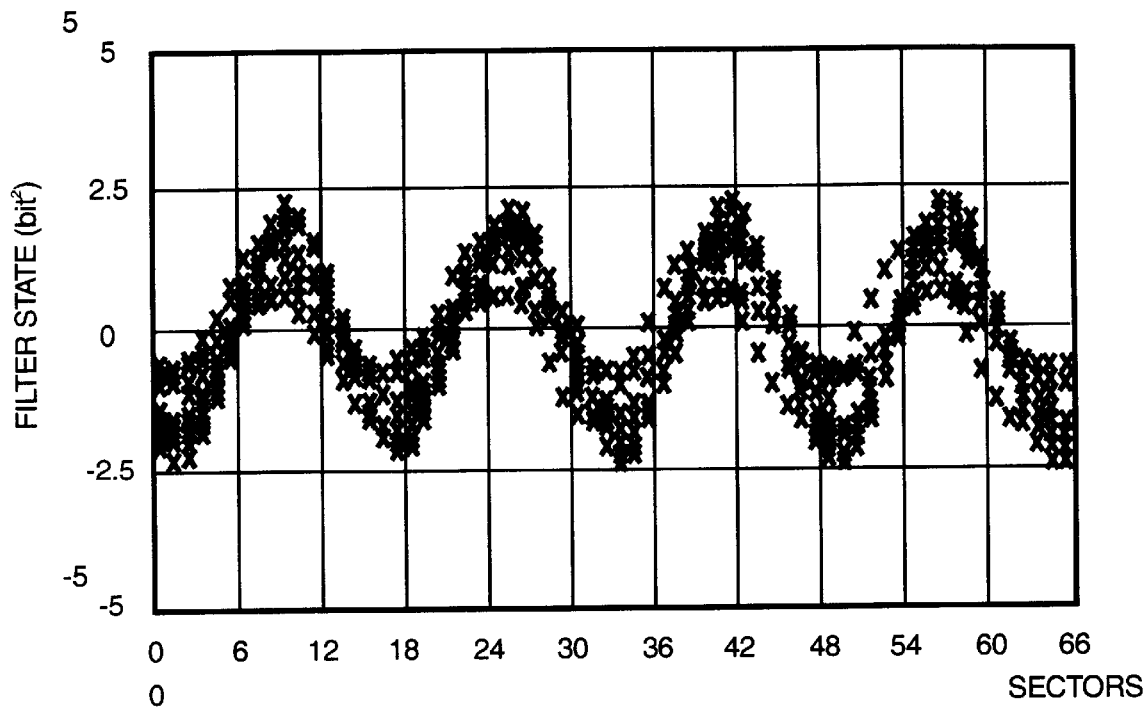
FIG. 4a is a frequency domain plot of the frequency stability of a flutter mode using overlapping time traces of the PES for the first flutter mode of FIG. 3a as filtered by a 6 dB peak filter for 10 revolutions of the disk drive, according to the present invention.
Figure 4B:
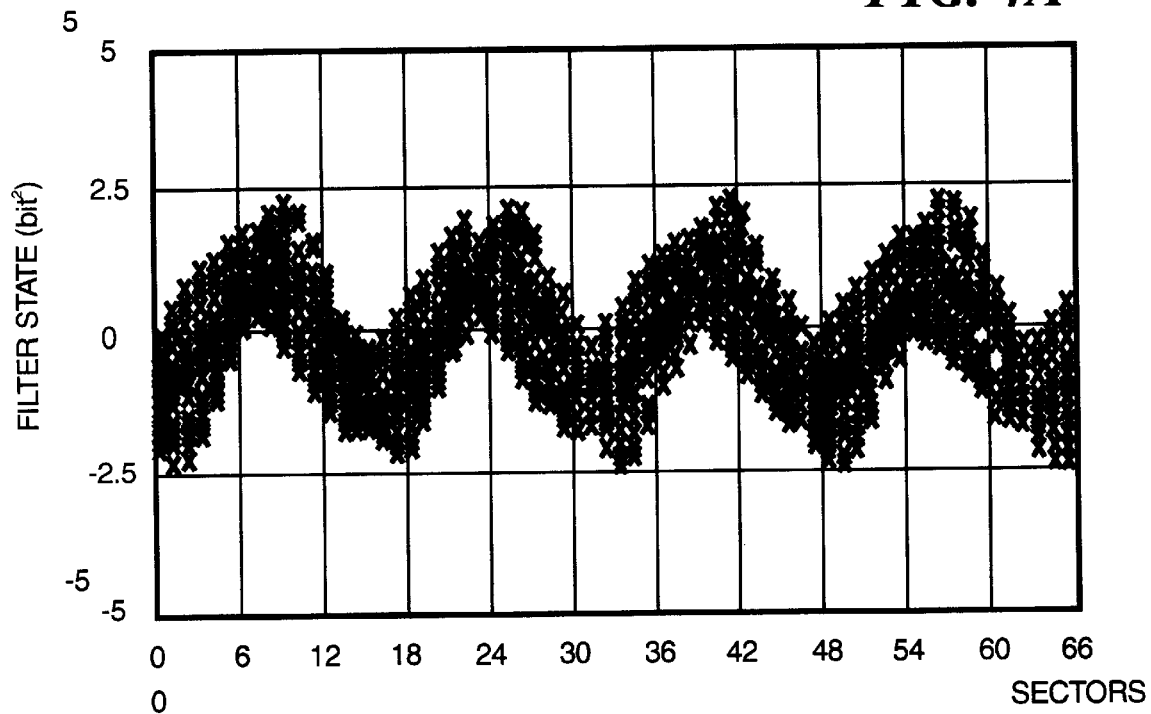
FIG. 4b is a frequency domain plot of the frequency stability of a flutter mode using overlapping time traces of the PES for the first flutter mode of FIG. 3a as filtered by a 6 dB peak filter for 30 revolutions of the disk drive, according to the present invention.

FIG. 4a is a frequency domain plot of the frequency stability of a flutter mode using overlapping time traces of the PES for the first flutter mode of FIG. 3a as filtered by a 6 dB peak filter for 10 revolutions of the disk drive, according to the present invention. FIG. 4 is a frequency domain plot of the frequency stability of a flutter mode using overlapping time traces of the PES for the first flutter mode of FIG. 3a as filtered by a 6 dB peak filter for 10 revolutions of the disk drive, according to the present invention. For the X-axes, one revolution of the disk platter 108 is equal to about 66 tracks which takes about 8.5 milliseconds. So time or rotations can be used interchangeably in these plots. It can be seen that for 10 and 30 revolutions of the repeated traces the frequency feature is rather consistent even though not fixed. Hence, the use of a narrow band peak filter running in cascade or parallel with the conventional track following controller provides an opportunity that was not obvious before to servo compensate against the disk-flutter mode. It will also be apparent to those skilled in the art that a broad band peak filter will produce excessive phase lag in the open-loop crossover region, and would destabilize the conventional track follow controller.

B. Disk-Flutter Mode Filter Construction and Analysis

Figure 5A:
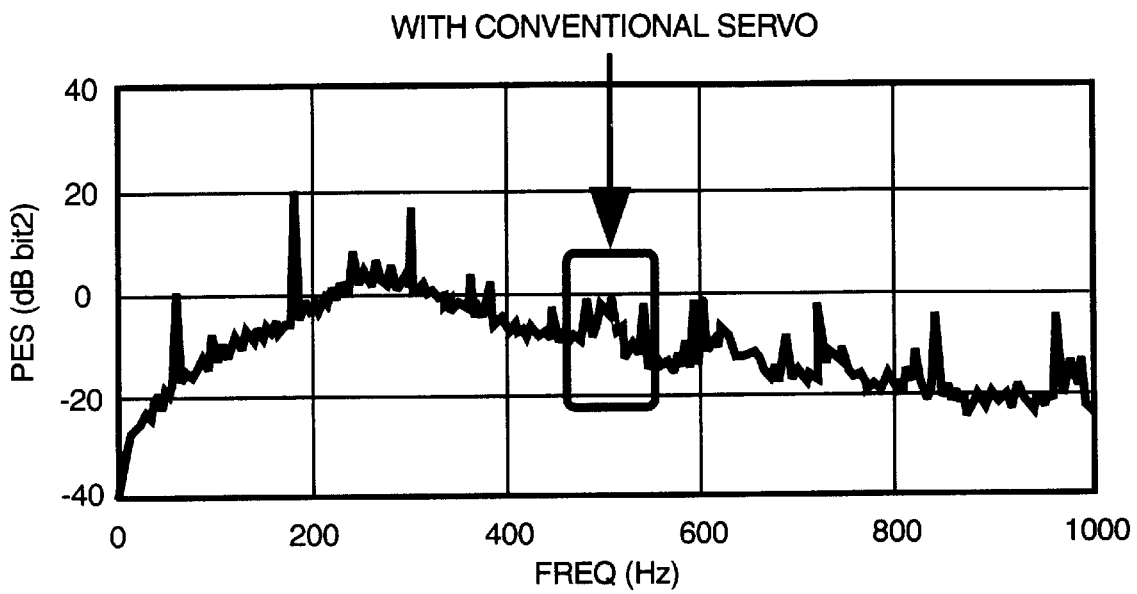
FIG. 5a is a frequency domain plot of the PES power spectrum of the disk drive of FIG. 2 without any filtering using the disk-flutter servo, according to the present invention.
Figure 5B:
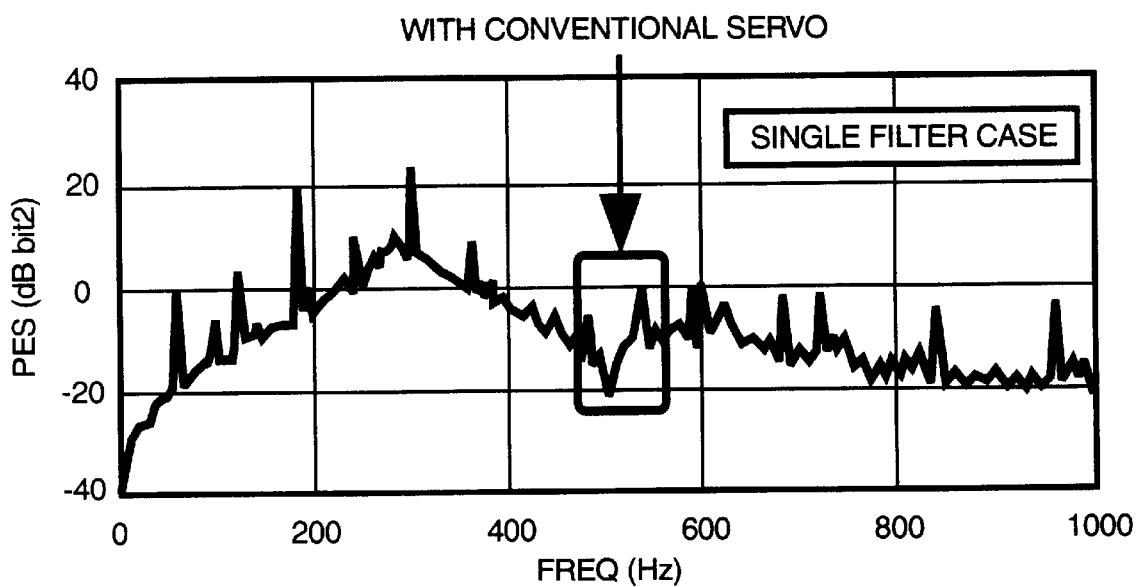
FIG. 5b is a frequency domain plot of the PES power spectrum of the disk drive of FIG. 2 with a single 6 dB peak filter set at 501 Hz in series with the disk-flutter servo, according to the present invention.

Having identified the that the disk-flutter mode has a plurality of peaks within the frequency domain, but that each frequency component is rather consistent over the time domain, the filter construction begins. FIGS. 5a and 5b shows the power spectrum of PES with and without a single 6 dB peak filter configured in parallel to the track-follow controller. From the spectral plot it can be seen that the peak filter at 501 Hz does indeed removes the flutter component corresponding to this frequency.

Figure 6A:
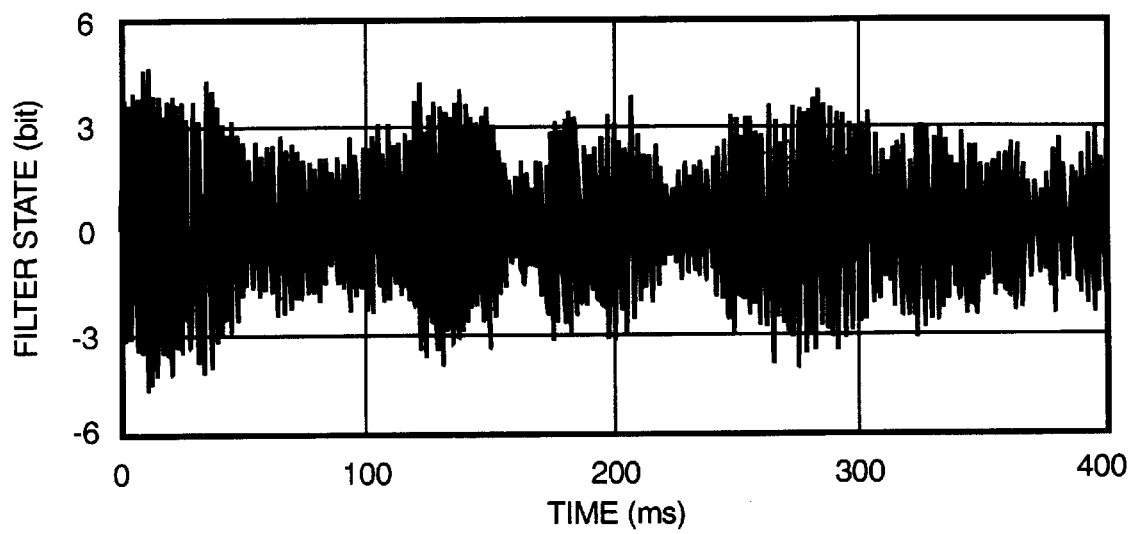
FIG. 6a is a time domain plot of the PES corresponding to the PES frequency trace in FIG. 5a without any filtering, according to the present invention.
Figure 6B:
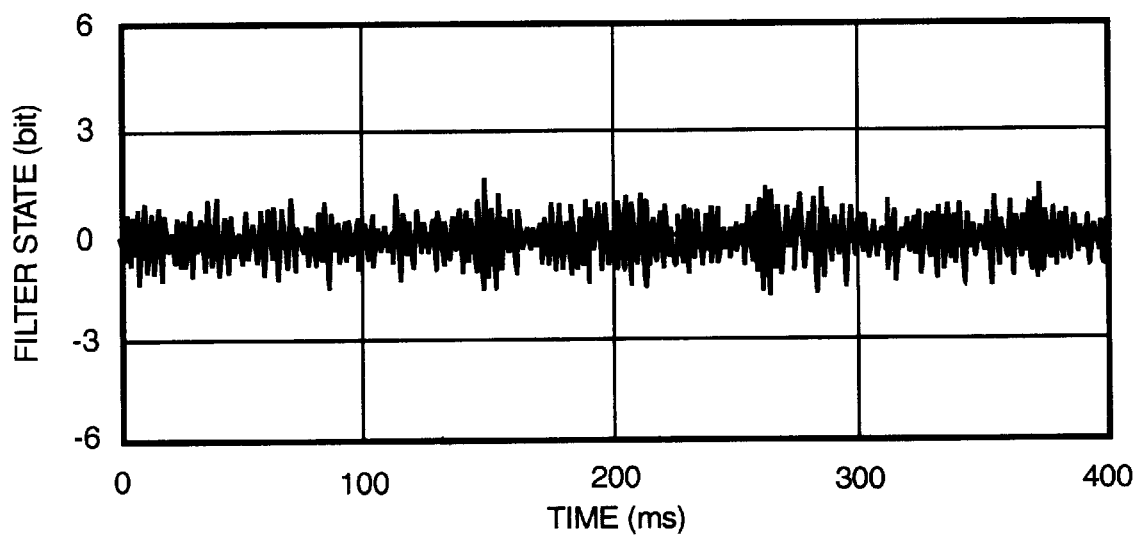
FIG. 6b is a time domain plot of the PES corresponding to the PES frequency trace in FIG. 5b with a single 6 dB peak filter set at 501 Hz filter, according to the present invention.

FIG. 5a is a frequency domain plot of the PES power spectrum of the disk drive of FIG. 2 without any filtering using the disk-flutter servo 208. FIG. 5b is a frequency domain plot of the power spectrum of the PES of the disk drive of FIG. 2 with a single 6 dB peak filter set at 501 Hz in series with the disk-flutter servo 208. The effectiveness of a servo solution to disk-flutter is see by this 6 dB filter. This effectiveness is further shown in the corresponding amplitude time domain plots. FIG. 6a is a time domain plot of the PES corresponding to the PES frequency trace in FIG. 5a without any filtering. FIG. 6b is a time domain plot of the PES corresponding to the PES frequency trace in FIG. 5b with a single 6 dB peak filter set at 501 Hz filter. When the filtering is repeated using two peak filters configured centered at 501 Hz and 617 Hz, and corresponding enhancements in the frequency domain are seen (not plotted). All peak filters are know to effect the phase characteristic by providing a lead and then a lag component around the flutter frequency. A conventional product servo 204 provides about 30 degrees phase lead. It becomes apparent, that a 20 dB or 30 dB broad band filter will not work because of the excessive lag that causes instability of the product servo 204. If a filter designer over compensates, there can be instability to the phase and if the filter under compensates, there will be no effect on the disk flutter modes. These filters in FIG. 6 are optimally tuned. Recall as determined above in section A "Disk-Flutter Mode Measurement and Analysis" above, in the hard disk system 102, the flutter dynamics consists of a multitude of frequency components, and does not occur at a single frequency. The disk drive 200 analyzed had marginal servo transfer function phase properties due to other system constraints, and the use of several disk-flutter mode peak filters produced excessive transfer function distortion in the neighborhood of the flutter frequency region. Accordingly this distortion limits the TMR measurement in terms of 1-sigma PES. Therefore, in order to determine the viability of servo compensating more than one flutter frequency component, a simulation method in which a conventional product servo 204 having 40 degree phase margin is used in the subsequent analysis to demonstrate the principle of control disk-flutter modes with narrow band filters.

Figure 7A:
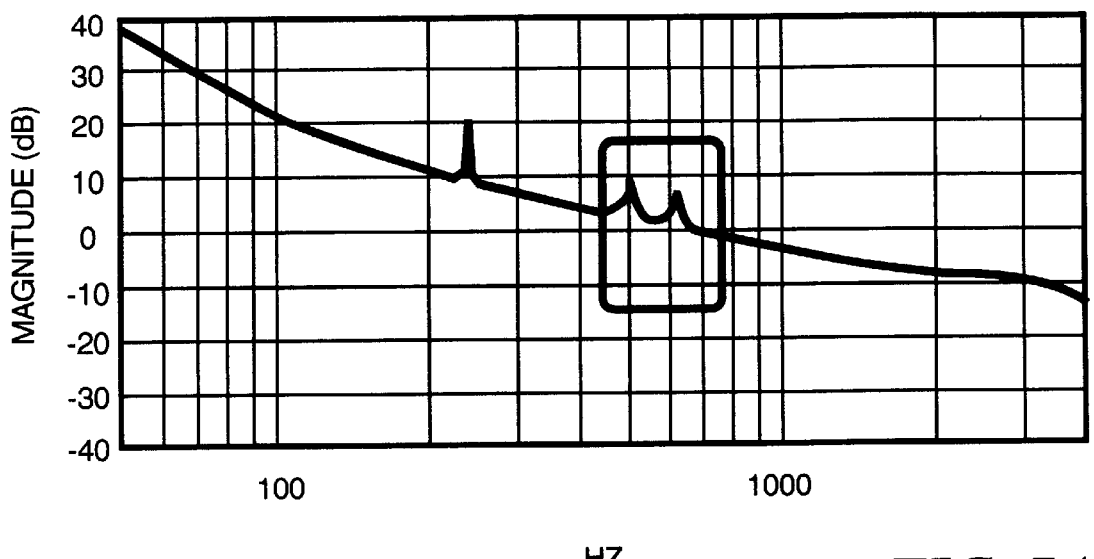
FIGS. 7a–b is a set of frequency domain plots for an open-loop transfer function of the magnitude and phase plots for a disk-flutter servo having two 6 dB peak filters to compensate for a simulated 501 Hz and 617 Hz disk-flutter components, according to the present invention.
Figure 7B:

FIGS. 7a–b is a set of frequency domain plots of an open-loop transfer function of magnitude and disk phase portions for a disk-flutter servo having two 6 dB peak filters to compensate for a simulated 501 Hz and 617 Hz disk-flutter components. Note that the narrow peak characteristics illustrated at 180 Hz is irrelevant for the characterization of the flutter servo modes. The narrow peak characteristics at 180 Hz is used to compensate for spindle harmonic effect which is not associated with disk-flutter according to the present invention.

Figure 8A:
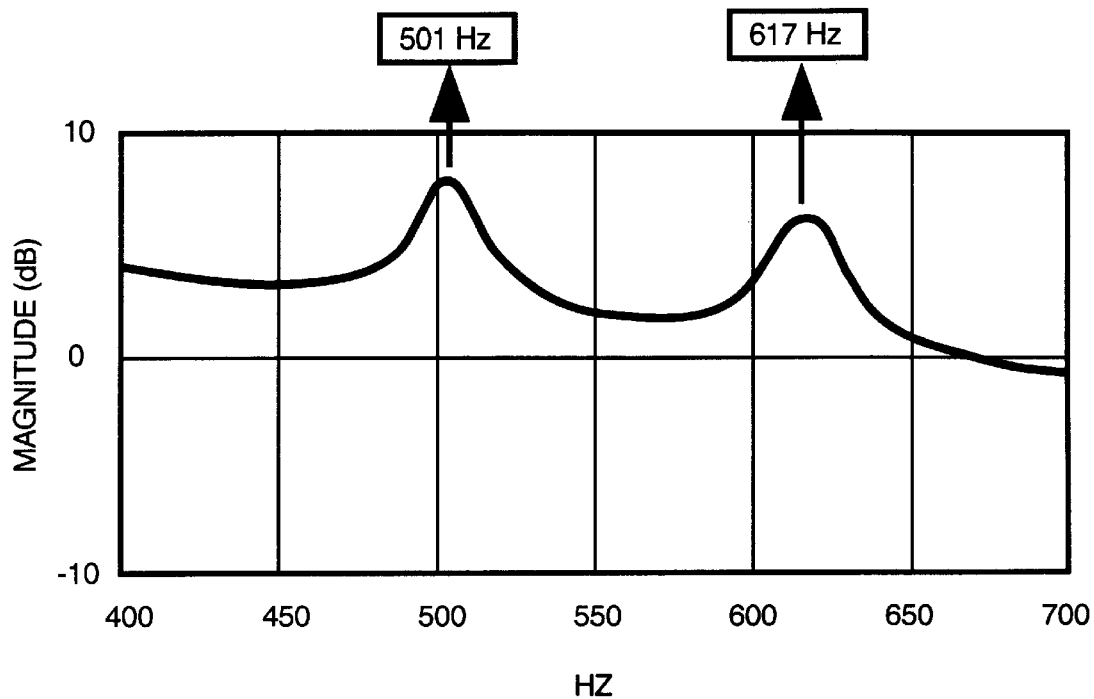
FIG. 8 is a frequency plot detailing the transfer function of FIG. 7, according to the present invention.
Figure 8B:
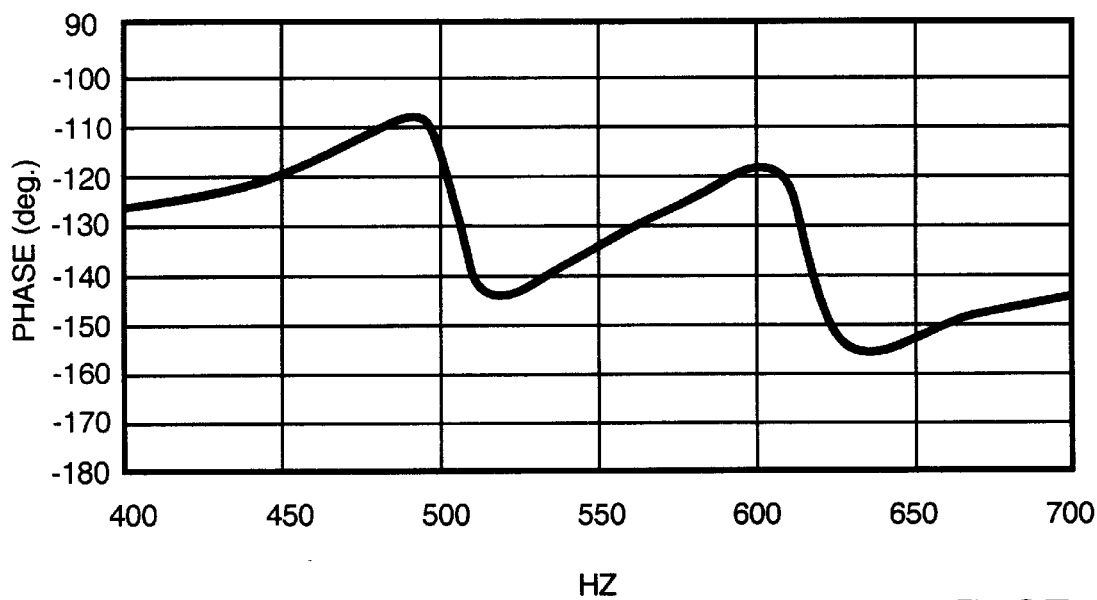

Turning to FIG. 8 is a frequency plot detailing the transfer function of FIG. 7. Observe that in order for the filters to produce minimum side effect, the phase lead of the conventional controller should be above 40 degrees nominally. The side effect refers to undesirable distortion of the nominal rejection transfer function that could amplify other PES components inadvertently in other regions in the frequency domain. For example, notice that the disk flutter modes occurs at about 600–700 Hz. This is precisely the area of cross-over of the zero axis for the magnitude. In general, with any filter, the larger the gain, the larger the growth in phase margin. To remain stable, the zero magnitude crossing of a filter design must have a phase above −180 degrees. For higher flutter frequencies in the range of 800–900 Hz, the phase margin begins to droop below the −180 degree line and the disk drive system 102 become unstable. Accordingly, the design is to tackle only the first two flutter modes to reduce the chances of injecting instabilities through reduction in phase margin for high disk-flutter frequencies.

Figure 9A:
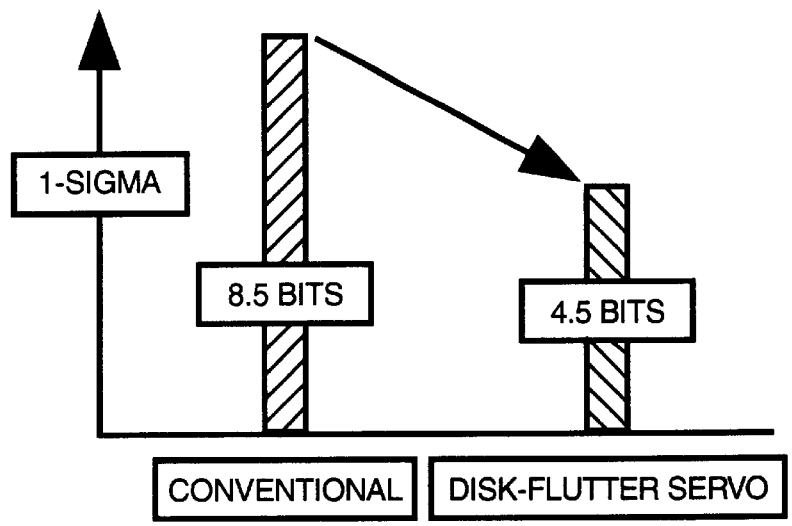
FIG. 9a is a plot of the estimated change in TMR due to drift in nominal gain of the disk-flutter servo system in FIG. 7, according to the present invention.
Figure 9B:
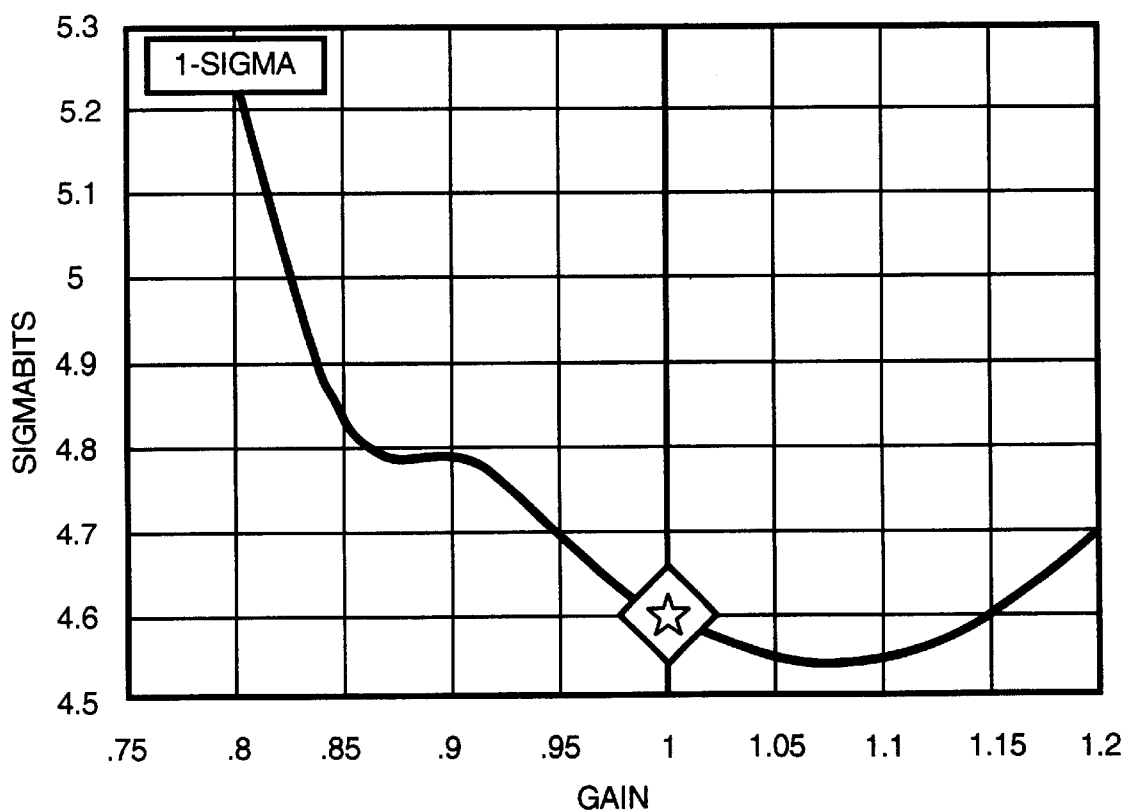
FIG. 9b is a plot of the sensitivity of the disk-flutter servo in FIG. 7 due to system gain uncertainty, according to the present invention.

FIG. 9a is a plot of the estimated change in TMR due to drift in nominal gain of the disk-flutter servo system in FIG. 7, according to the present invention. Notice the improvement in the 1-sigma TMR of 8.5 PES bits as compared to 4.5 bits when the disk-flutter servo for 501 Hz and 617 Hz are added. FIG. 9b is a sensitivity plot of the disk-flutter servo of FIG. 7 due to system gain uncertainty. About 10% degradation in total 1-sigma TMR is observed for a 20% drop in gain, and only a 2% degradation is seen for a 20% increase in gain. In other words, the open-loop gain changes on a product to product basis. As gain goes up to +/−5 to 10% in variation, which is typical in a disk servo product tolerances, the sigma levels of the errors does not get excessively aggravated and in fact improves if the gain is increased. It should be noted that the sensitivity estimates are highly dependent on the properties of the disturbance spectrum.

Figure 10:
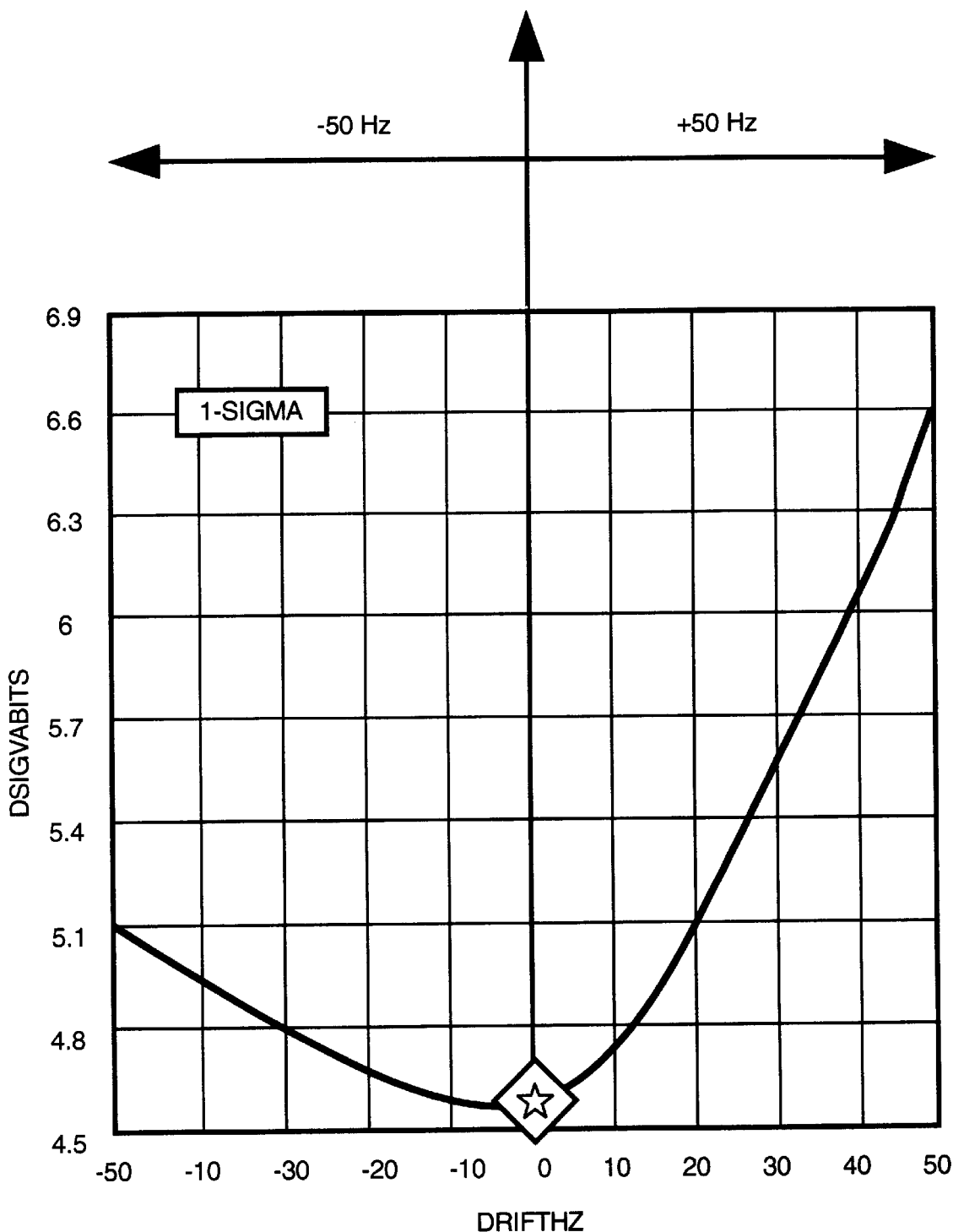
FIG. 10 is a plot of the effect of flutter mode frequency shift on TMR for a fixed flutter-servo system in FIG. 7 according to the present invention.

FIG. 10 is a plot of the effect of flutter mode frequency shift on TMR for a fixed flutter-servo system in FIG. 7. For a shift of +/−50 Hz in the both 501 Hz and the 617 Hz, the TMR degradation of 13% to 45% is measured. Therefore it is important to have an accurate estimate of the flutter frequency for each hard disk 102 product type and for each disk 108 or platter so that the peak frequency can be set accordingly. The disk-flutter system servo designer must use well timed calibration runs to keep track of each flutter mode frequency if optimum TMR values are to be secured.

Figure 11:
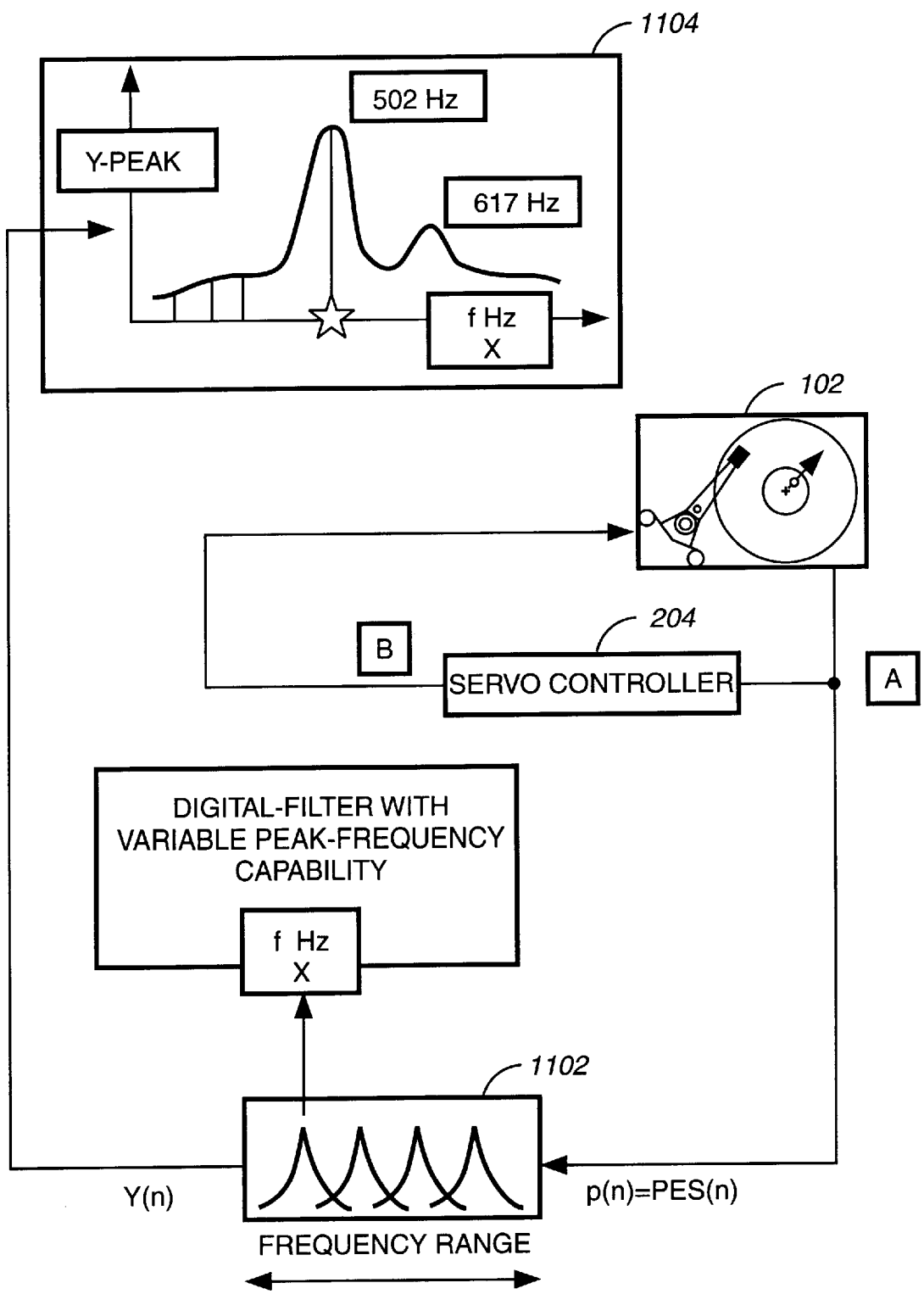
FIG. 11 is a block diagram showing one procedure for determining the center frequency of a disk-flutter mode using a digital sweep method, according to the present invention.
Figure 12A:
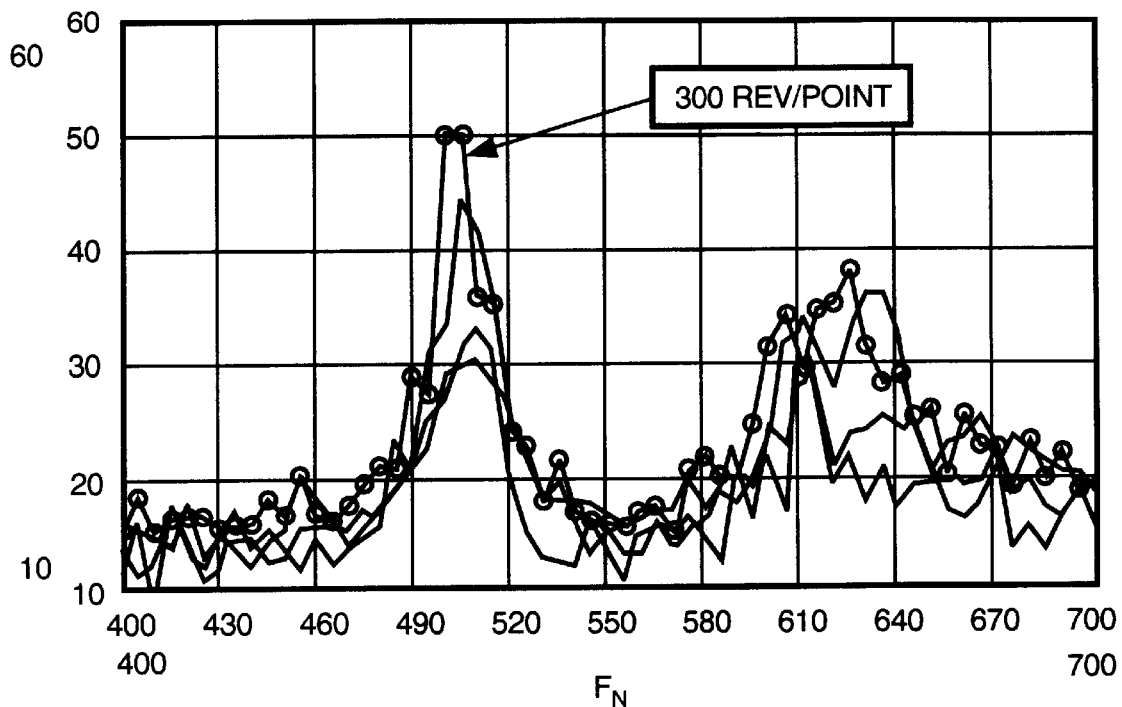
FIG. 12a is a plot of the results using the digital sweep method of FIG. 11 with a peak filter of 20 dB, according to the present invention.
Figure 12B:
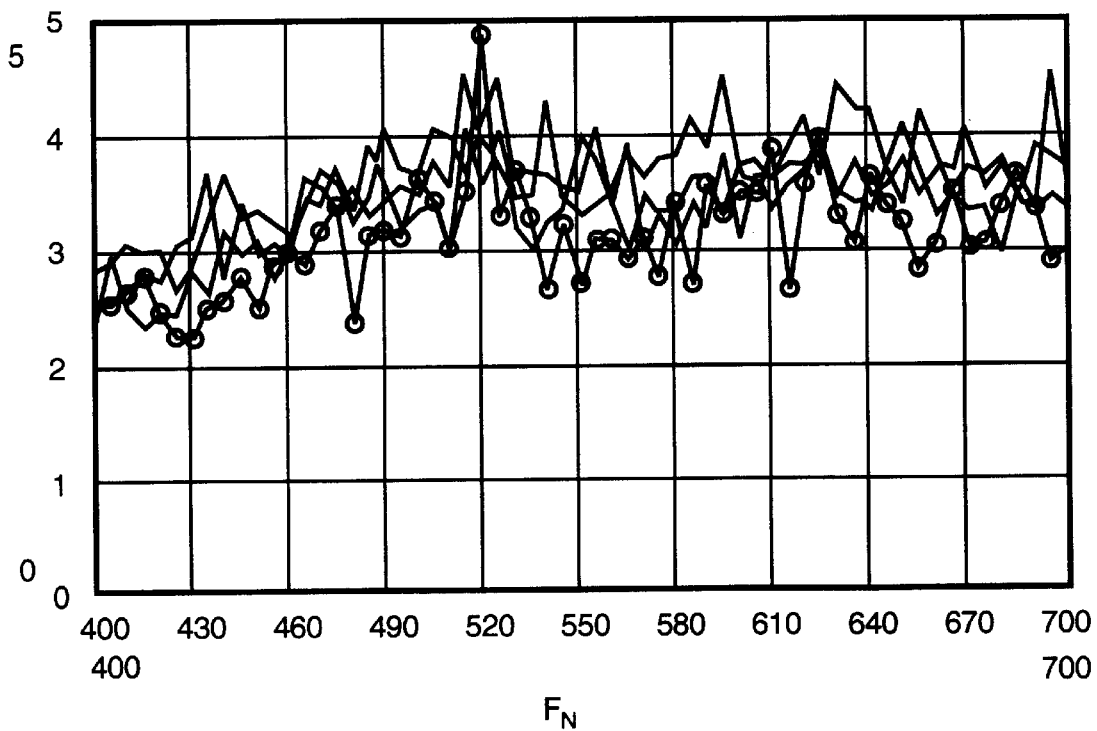
FIG. 12b is a plot of the results using the digital sweep method of FIG. 11 with a peak filter of 6 dB, according to the present invention.

FIG. 11 is a block diagram showing one procedure for determining the center frequency of a disk-flutter mode using a digital sweep method, according to the present invention. When the disk drive 102 is put in track following mode, the PES 206 stream is passed through a digital filter 1102 whose peak frequency is variable. The peak frequency of the digital filter 1102 is gradually increased from a minimum frequency value up through a maximum. The filter peak output amplitude is memorized in a table as part of the spectrum analyzer (not shown) which is depicted by the graph 1104. In the example used, the peak amplitude occur around 502 Hz and 617 Hz. These peak amplitudes can be determine quickly be knowing the measured open-loop nominal values of the filter peaks for the servo and the nominal servo drift values. Typical drift value are +/1 50 to 100 Hz and other values are contemplated. The resolution of the frequency measurement in the spectrum analyzer can be adjusted by means of step size and time record length used to generate the spectral table. Typical step sizes are 10 Hz but other sizes are possible. FIG. 12a is a plot of the results using the digital sweep method of FIG. 11 with a peak filter of 20 dB and FIG. 12b is corresponding plot of the results with a peak filter of 6 dB. Each trace corresponds to different time length as denoted by number of revolutions used to compute each data point. It can be seen that a 20 dB peak filter with 300 revolution long data record converges to 500 Hz and 620 Hz, very close to where the flutter components are located. Improper choice of the detection filter peak gain can produce poor results as shown in FIG. 12b in which the spectral peaks are averaged out along with other noise components in the PES 206 stream.

Figure 13:
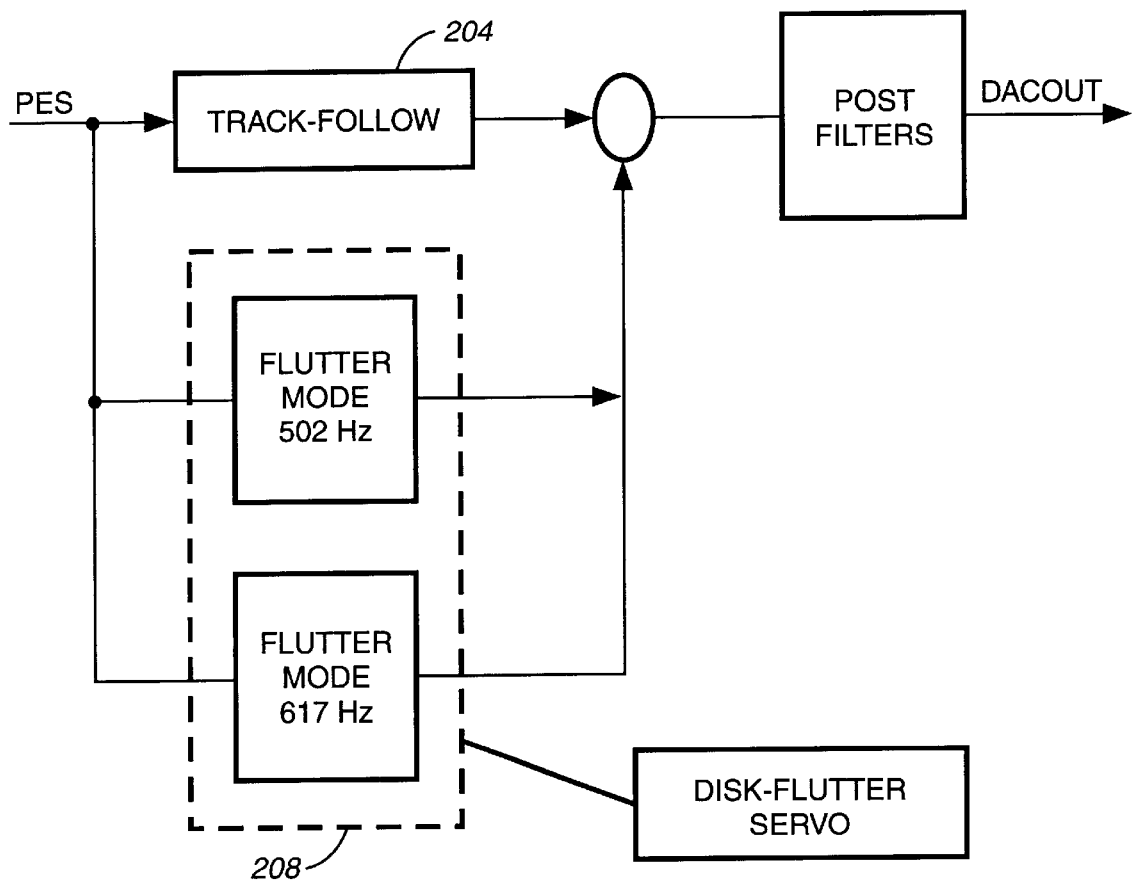
FIG. 13 is a block diagram of one embodiment of the disk-flutter filter for 502 Hz and 617 Hz with a standard product servo in parallel form, according to the present invention.
Figure 14:
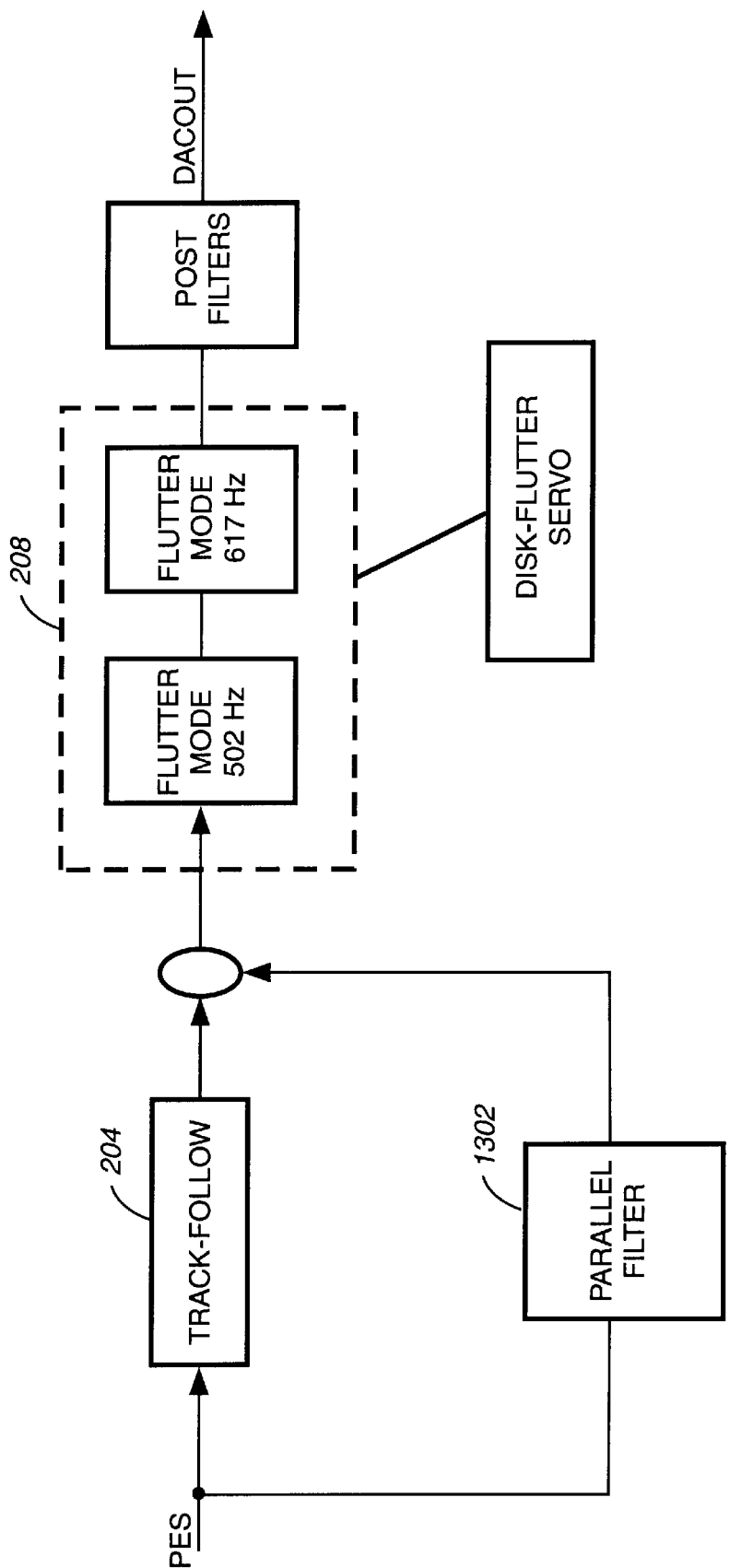
FIG. 14 is a block diagram of another embodiment of the disk-flutter filter for 502 Hz and 617 Hz with a disk-flutter servo in series filter form, according to the present invention.

Two disk-flutter servo architectures are available based on the placement of disk-flutter filters relative to the product servo 210. One implementation is a parallel implementation and the other implementation is a series implementation. FIG. 13 is a block diagram of one embodiment of the disk-flutter filter for 502 Hz and 617 Hz with a standard product servo according to the present invention in parallel form. FIG. 14 is a block diagram of another embodiment of the disk flutter filter for 502 Hz and 617 Hz with a disk-flutter servo 208 in series filter form. The parallel filter 1302 may be used for other filters such as the described in Ser. No. 08/119,181 by S. M. Sri-Jayantha et al. entitled "Adaptive Vibration Control For Servo Systems In Data Storage Devices" filed on Jul., 20, 1998 and is commonly assigned herewith to IBM. It was found that when the peak gain is about 6 dB a series realization always produces 6 dB peak gain enhancement whereas a parallel implementation may require prior knowledge of the conventional track follow product servo 204 properties. Otherwise the coupling effect of two parallel system (i.e., conventional product 204 servo and a peak filter) could produce undesirable open-loop transfer function characteristics. Therefore a modular design of conventional track following controller and peak filters for a disk-flutter servo 208 may not be not be effective in parallel realization and appropriate caution must be observed. However in cases where the peak gain is substantially higher than the corresponding conventional servo gain at the frequency, then either the series or parallel implementation can be implemented.

Figure 15:
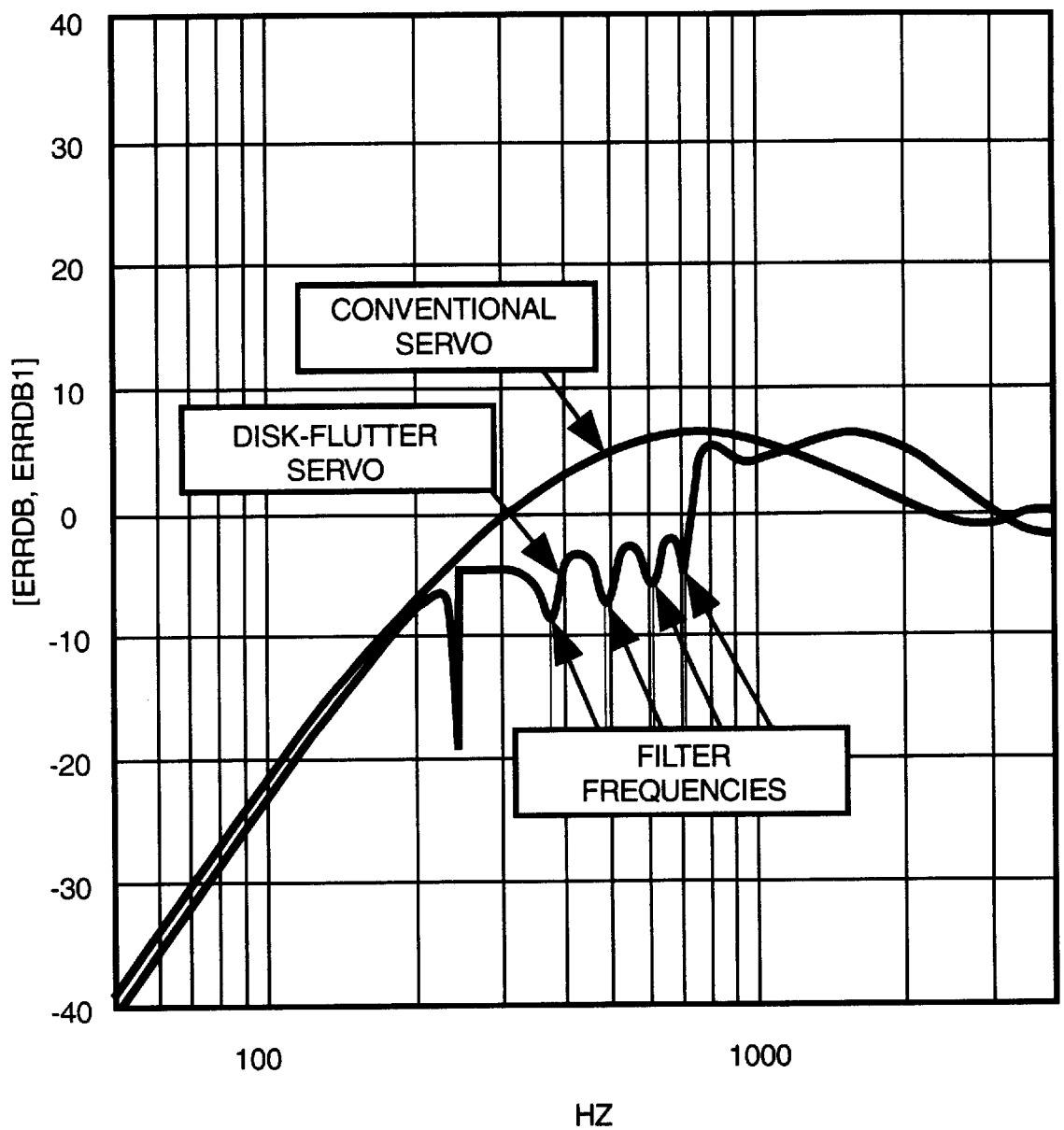
FIG. 15 is a frequency domain plot of the conventional product servo of FIG. 2 as compared with the computed error rejection transfer function of a di-flutter servo having four filters for disk-flutter TMR, according to the present invention.

FIG. 15 is a frequency domain plot of the conventional product servo of FIG. 2 as compared with the computed error rejection transfer function of a flutter servo having four peak filters for disk-flutter TMR including a peak filter around 240 Hz. As illustrated, the use of peak filters does indeed improve the rejection levels at and around the flutter frequencies. This point is important, the improvement in rejection is at the flutter-mode frequency. The phase loss due to one peak filter is balanced by the phase lead provided by the adjacent filter. Hence only the last, that is, the highest frequency filter is the one that produces an undesirable phase loss resulting in the loss of rejection gain. This effect allows the rejection transfer function to rise above the conventional levels at higher frequencies in the range of 1.2 to 3 KHz. Thus, if that hard disk drive 102 does not have any significant disturbance components at this higher frequency range then a clear advantage is achieved by the disk-flutter servo as demonstrated by FIG. 15. On a selective frequency basis, it may be better to employ this embodiment.

Figure 16A:
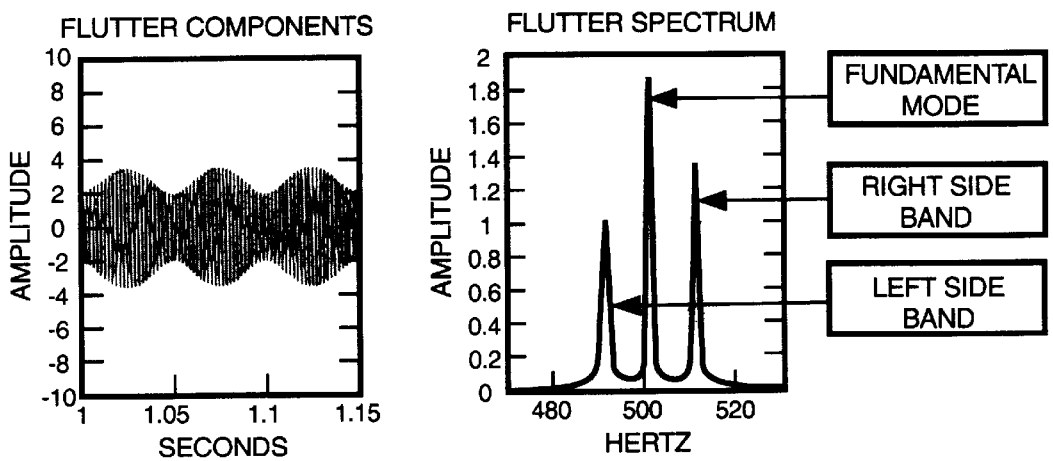
FIG. 16a is a set of time domain and frequency domain plots for the flutter spectrum at 512 Hz showing the effect of fixed frequency amplitude modulation with the fundamental harmonic, left side band and right side band preserved, according to the present invention.
Figure 16B:
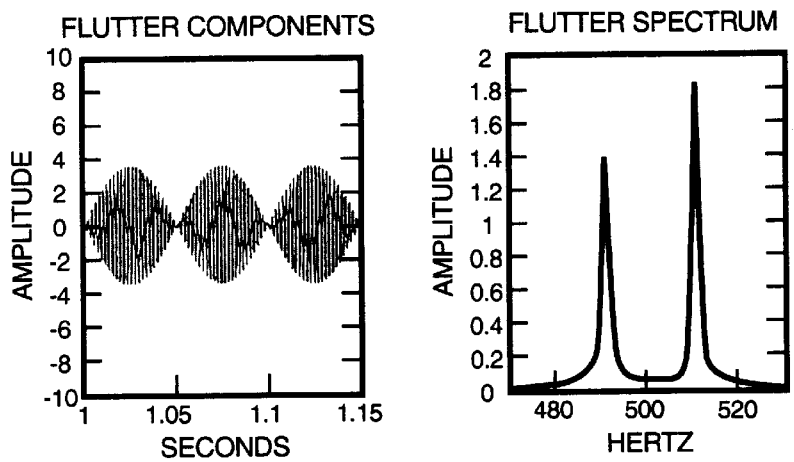
FIG. 16b is a set of time domain and frequency domain plots showing the effect of fixed frequency amplitude modulation with no fundamental harmonic and the left side and right side band preserved, according to the present invention.
Figure 16C:
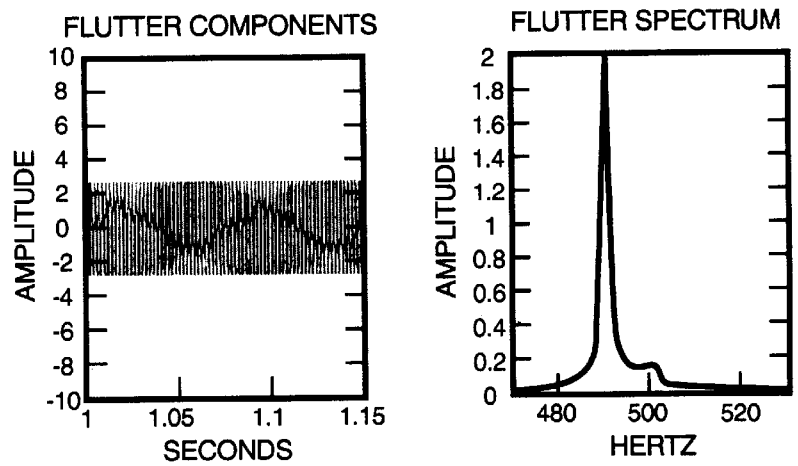
FIG. 16c is a set of time domain and frequency domain plots showing the effect of fixed frequency amplitude modulation with only the left side band preserved, according to the present invention.
Figure 17A:
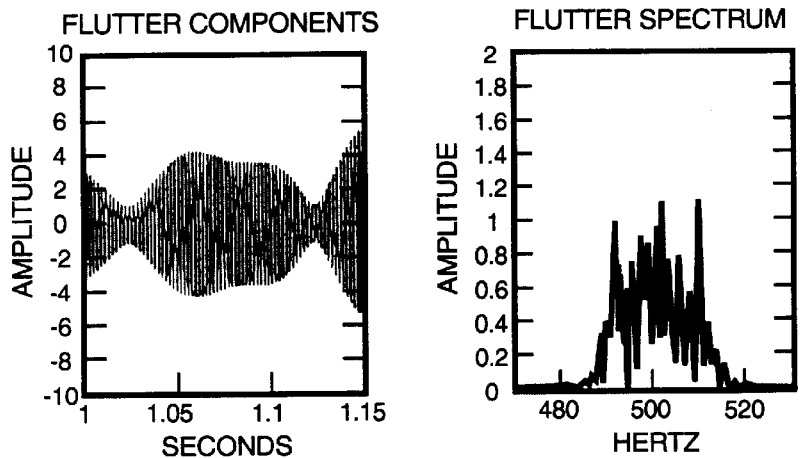
FIGS. 17a–c are sets of time domain and frequency domain plots corresponding to FIG. 16a–c respectively, illustrating the effect of randomized frequency modulation, according to the present invention.
Figure 17B:
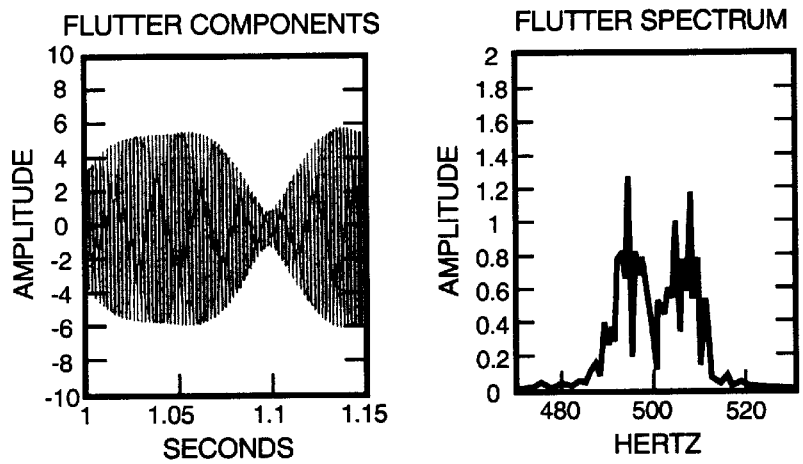
Figure 17C:
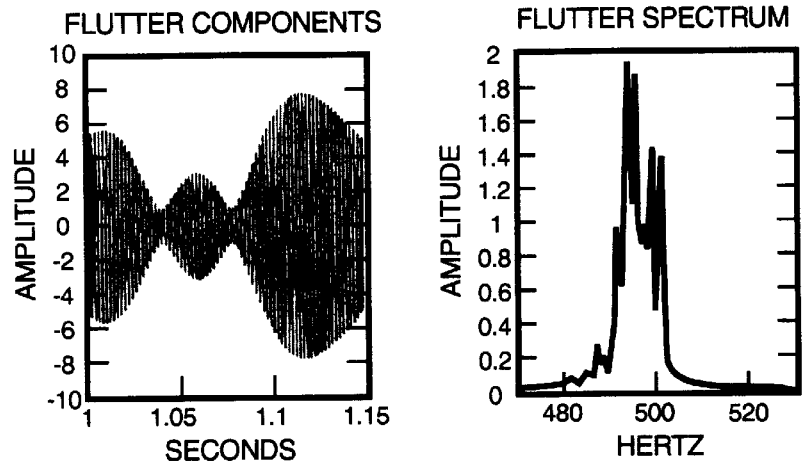

In another embodiment, a different filter design is used when the phase loss of the disk-servo system 208 is required to be minimized consideration is shown. This result is shown in FIG. 16, which depicts a set of time domain and frequency domain plots for the flutter spectrum at 512 Hz showing effect of fixed frequency amplitude modulation. Here is a demonstration of the time domain and we are determining what the amplitude modulation means in light of the known literature on servo systems. In FIG. 16a notice the flutter spectrum in the frequency domain has three components: (i) a fundamental harmonic; (ii) a left side band; and (iii) a right side band. FIG. 16b is a set of time domain and frequency domain plots showing effect of fixed frequency amplitude modulation with no fundamental harmonic and the left side and right side band preserved. FIG. 16c is a set of time domain and frequency domain plots showing effect of fixed frequency amplitude modulation with only the left side band preserved. The actual flutter mode component, as shown in FIGS. 3b–f, has a mixture of modulation frequency and the strength of each modulation frequency appears to be time varying. This observation is simulated by generating a randomly changing modulation frequency pattern. FIGS. 17a–c are a set of time domain and frequency domain plots corresponding to FIGS. 16a–c respectively, illustrating the effect of randomized frequency modulation. Observe that the measured flutter mode spectrum of FIG. 5a could fit into any one of these plots illustrated in FIG. 17. The point is simple. Instead of using a single relatively broad band peak filter to cover the full bandwidth of a given flutter mode, three narrow band peak filters per flutter mode could also be considered if phase loss in the disk-flutter servo is required to be minimized.

Figure 18A:
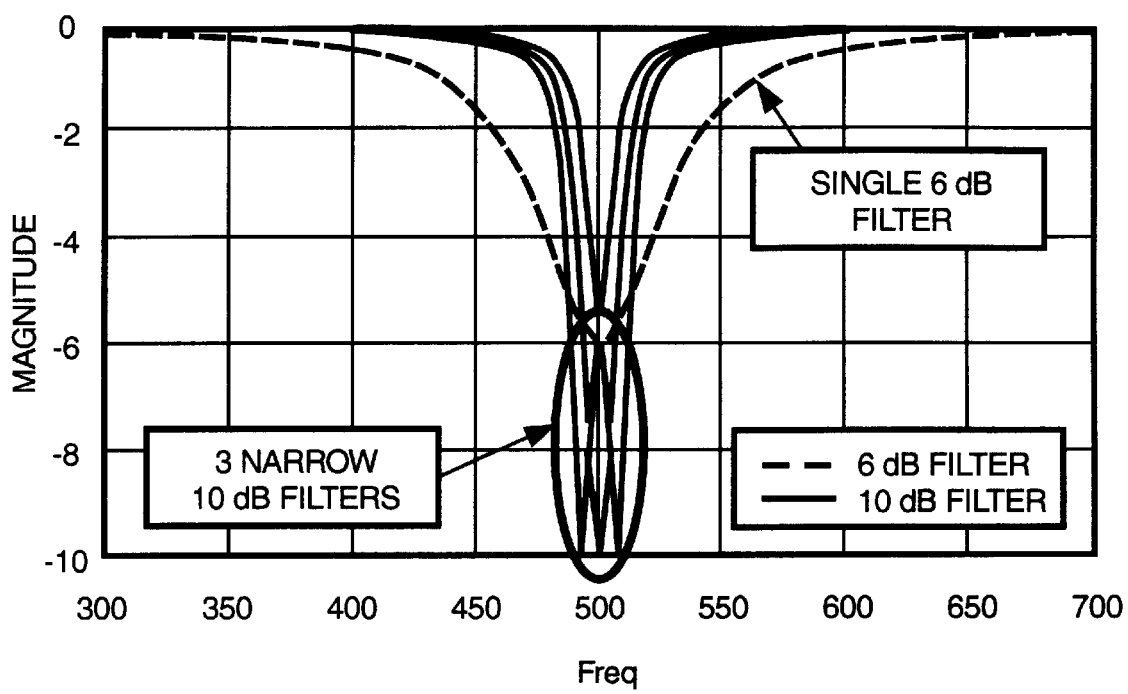
FIG. 18 is a set of frequency plots for the amplitude and the phase of the disk-flutter servo comparing the use of three narrow 10 dB filters versus the use of a single 6 dB filter according to the present invention.
Figure 18B:
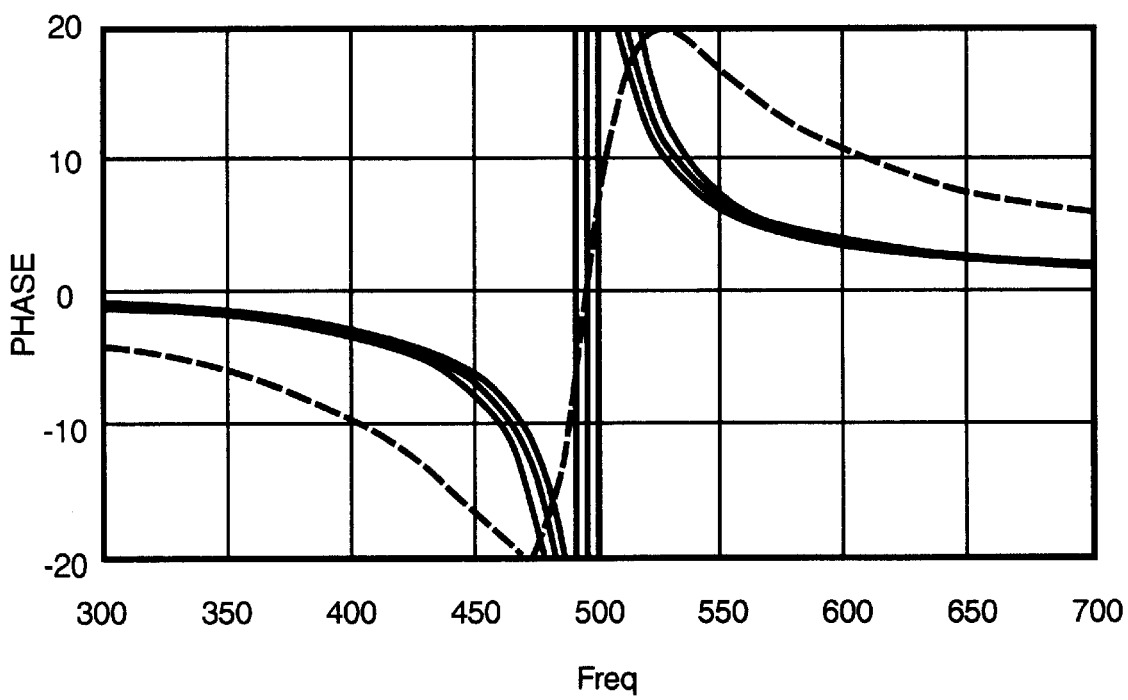

Next a comparison of the use of three narrow band peak filters to handle the three components of the fundamental harmonic and the two side bands versus a single 6 dB filter is plotted. It is important to note, that generally narrow filters provide better phase properties. FIG. 18 shows the comparison between a single 6 dB broad band filter and three narrow 10 dB band filters. The computed phase lag at 700 Hz shows that a phase loss improvement of 25% is achieved in the 3-filter configuration (8 deg. vs. 6 deg.).

Figure 19A:
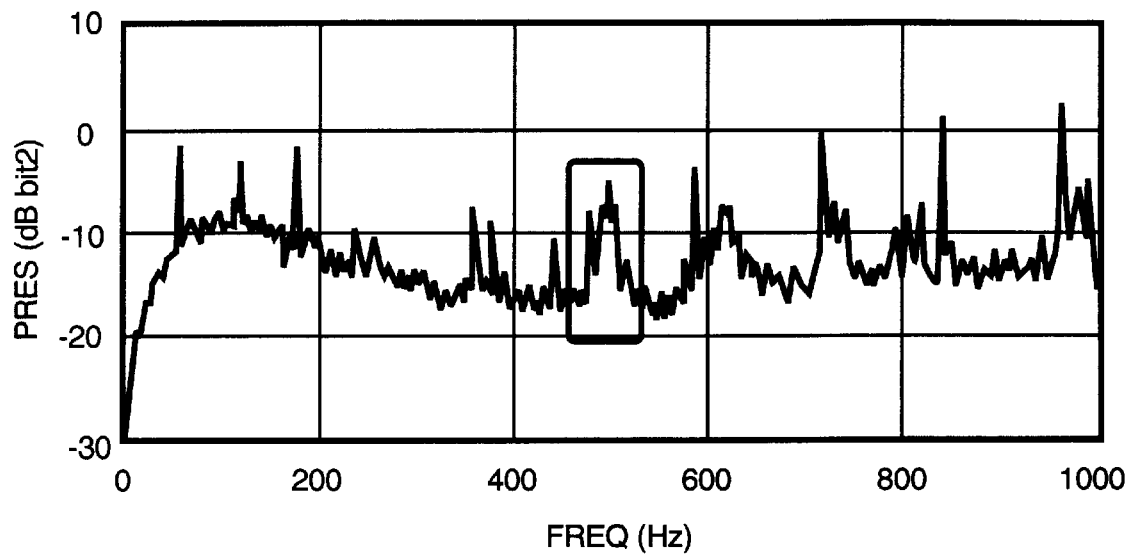
FIG. 19a is a frequency domain plot of the power spectrum corresponding with FIG. 18 without any filtering using the product server, according to the present invention.
Figure 19B:
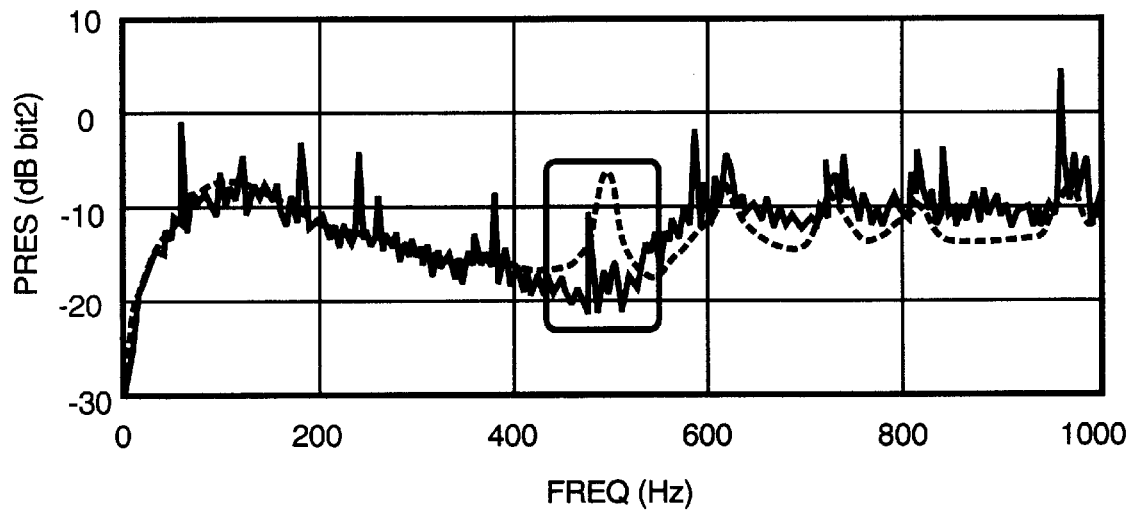
FIG. 19b is a frequency domain plot of the power spectrum of the PES of the disk drive of FIG. 2 with a three 10 dB peak filter set at 501 Hz in series with the product servo, according to the present invention.

FIG. 19 is a set of plots that illustrates the measured power spectrum with and without a disk-flutter servo correspond to FIG. 18 with the narrow band filters. In particular, FIG. 19a is a frequency domain plot of the power spectrum of the PES without any filtering, according to the present invention. FIG. 19b is a frequency domain plot of the power spectrum of the PES with a three 10 dB peak filter set at 501 Hz in series the disk-flutter servo 208, according to the present invention. It can be observed that the 3-filter case shows as much if not better suppression of energy in the PES at the 501 Hz flutter mode as a single broad band filter as shown in FIG. 5. The dashed line in FIG. 19b represents and average and super imposed original spectrum from FIG. 19a. Notice there is very little distortion of the spectrum of FIG. 19a except at the frequency of interest, the 501 Hz flutter-mode.

Figure 20:
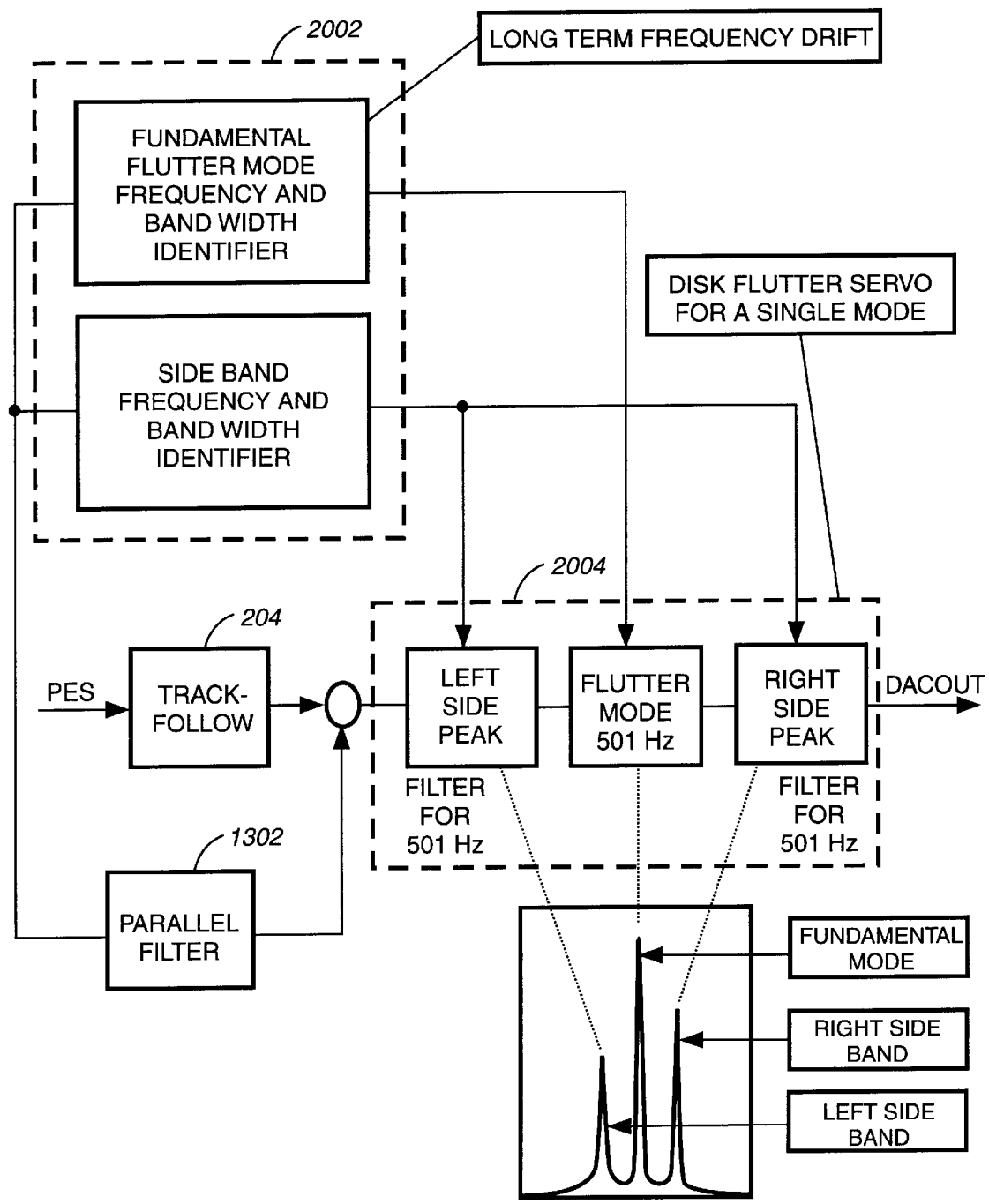
FIG. 20 is a block diagram of an embodiment for determining the center frequency of a disk-flutter mode as in FIG. 11 but with the ability to determine bandwidth of the fundamental mode and each of the corresponding side bands, according to the present invention.

Using the filter construction analysis from above for three 10 dB peak filters, an adaptive filter architecture is implemented by using three-peak filters per disk-flutter mode. FIG. 20 is a block diagram of an embodiment for determining the center frequency of a disk-flutter mode as in FIG. 11 but with the ability to determine bandwidth of the fundamental mode and each of the corresponding side bands 2002, according to the present invention. By employing a peak frequency and band width identifying operation as shown in FIG. 20, three peak filters can be adaptively tuned to achieve the maximum performance of the disk-flutter servo 208. Therefore, the flutter-mode filtering adjusted away from 501 Hz +/−10 Hz to be adjusted over long term drift that is due to normal operations of the hard disk drive 102. The drift can be accommodated dynamically using the frequency band identifier 2002 combined with (1) a dynamic filter with tunable center frequency 2004 or (2) a look-up table of previously cached measured valued for the model of this hard disk drive 1021. The fundamental flutter mode frequency is short term stable and does not require continuous adjustment of the peak filter properties. But the side band filters will require much frequent or even continuous updates in order to track the flutter TMR error resulting from the side bands. Using this method in FIG. 20, the filter configuration can be adaptively chosen to get the best performance out of a disk-flutter servo 208.

Figure 21A:
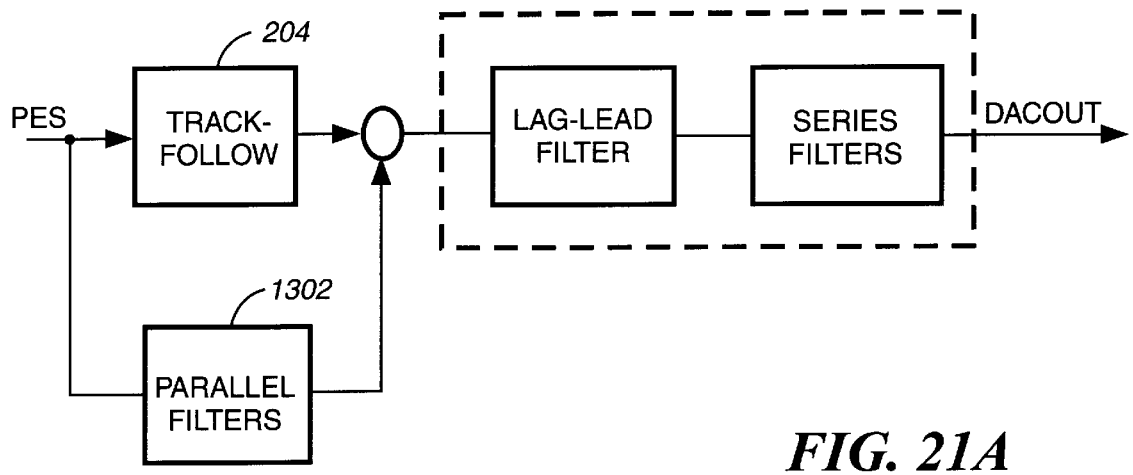
FIG. 21a is a block diagram of a lag-lead filter of an embodiment of the disk-flutter servo system in FIG. 20 with a lag-lead compensator.
Figure 21B:
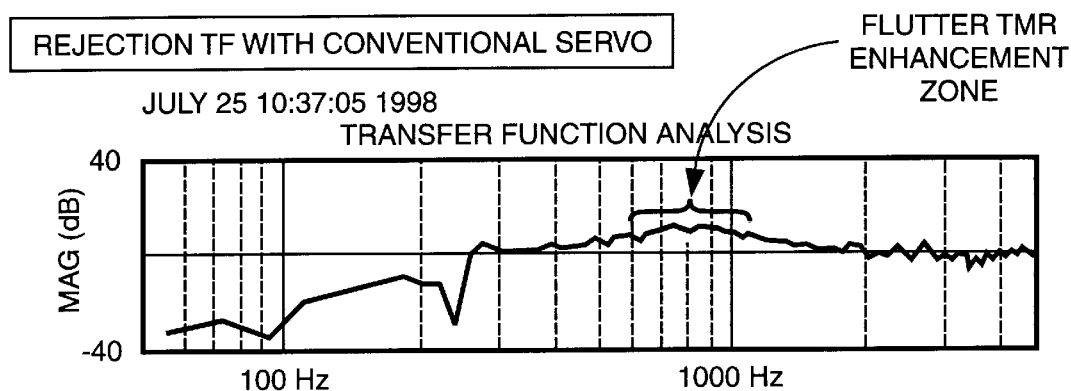
FIG. 21b is a frequency domain plot of the transfer function of a servo system with flutter mode components in the range of 500–1000 Hz without a lag-lead filter as shown in FIG. 21a, according to the present invention.
Figure 21C:
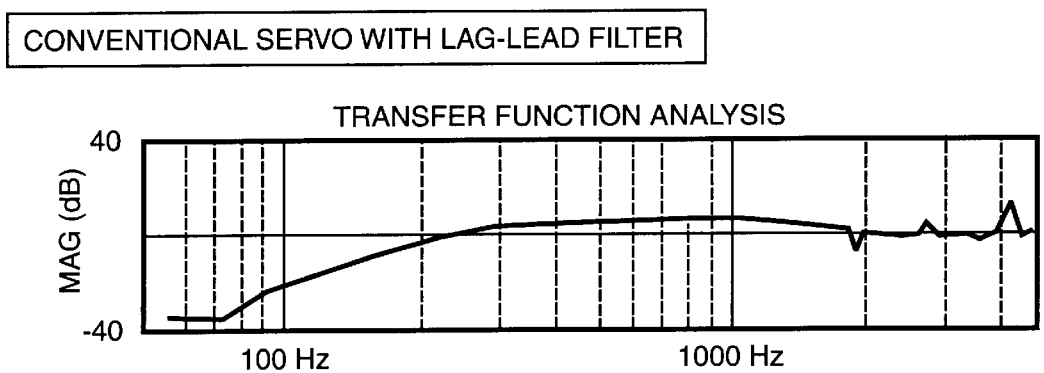
FIG. 21c is a frequency domain plot of the transfer function of a servo system of FIG. 22b with flutter mode components in the range of 500–1000 Hz with a lag-lead filter in position as shown in FIG. 21a, according to the present invention.

When the number of flutter modes is high, in certain configurations it may be sufficient to increase the phase of the open-loop transfer function so that rejection properties are balanced in such a way that the amplification of the flutter-induced disturbance is minimized. This servo characteristics is achieved by providing a lag-lead filter. FIG. 21a is a block diagram of a lag-lead filter of an embodiment of the disk-flutter servo system in FIG. 20 with a lag-lead compensator. FIG. 21b is a frequency domain plot of the transfer function of a servo system with flutter mode components in the range of 500–1000 Hz without a lag-lead filter as shown in FIG. 21a, according to the present invention. FIG. 22c is a frequency domain plot of the transfer function of a servo system of FIG. 22b with flutter mode components in the range of 500–1000 Hz with a lag-lead filter in position as shown in FIG. 21a, according to the present invention. In a particular hard disk drive 102, the flutter components existed in the range of 500–1000 Hz. For this hard disk drive 102, a lag-lead filter having corner frequencies at 100 Hz and 200 Hz for lag portion, and 500 Hz and 900 Hz for lead portion is constructed. Using this lag-lead filter it was possible to reduce the rejection peak by about 5 dB in the 700–900 Hz region as shown in FIG. 21. Observe the difference between the conventional servo and a servo that included the lag-lead filter as shown in FIG. 21. It was found that the reduction in low frequency gain accompanied by the use of a lag-filter may need to be compensated by narrow band peak filters to manage the low frequency periodic TMR sources. The use of lag-lead filters in certain situations, can provide some benefits. The flutter-mode is not amplified in the flutter TMR enhancement zone 2102. This shifting will not completely eliminate the flutter mode but in many cases reduces it and perhaps even eliminate the need for peak filters all together. Generally, amplitude is more effectively localized over phase.

Figure 22:
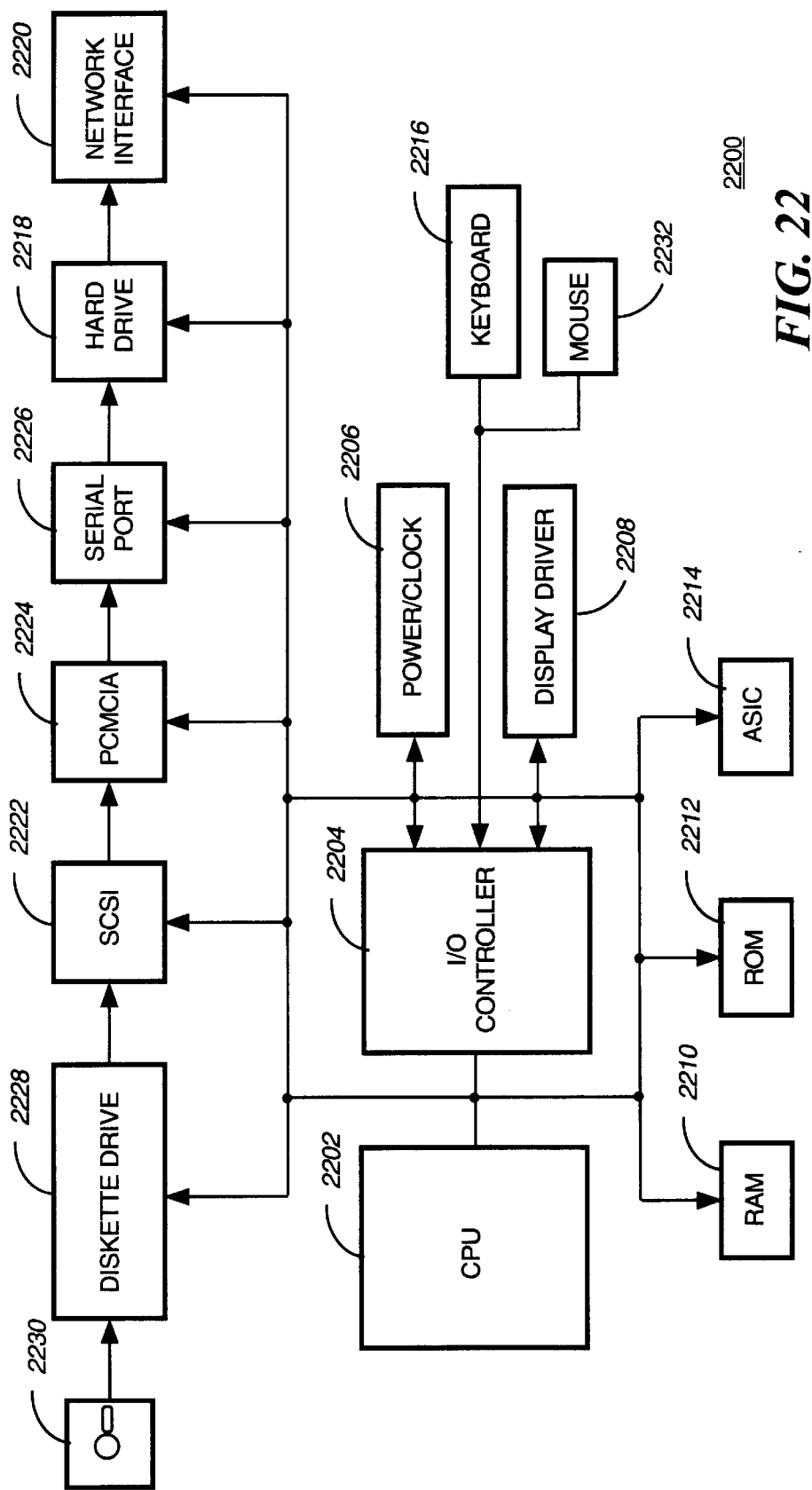
FIG. 22 is a block diagram of the major electrical components of an information processing system in which the flutter-servo system maybe implement, in accordance with the invention.

Turning now to FIG. 22, there is shown a block diagram of the major electrical components of an information processing 2200 system in which the flutter-servo system maybe be implemented, in accordance with the invention. The electrical components include: a central processing unit (CPU) 2202, an Input/Output (I/O) Controller 2204, a system power and clock source 2206; display driver 2208; RAM 22110; ROM 2212; ASIC (application specific integrated circuit) 2214 and a hard disk drive 2218. a keyboard 2216 with a mouse 2232 receives the user input. These are representative components of a computer. The operation of a computer comprising these elements is well understood. Network interface 2220 provides connection to a computer network such as Ethernet, TCP/IP or other popular protocol network interfaces. Optional components for interfacing to external peripherals include: a Small Computer Systems Interface (SCSI) port 2222 for attaching peripherals; a PCMCIA slot 2224; and serial port 2226. An optional diskette drive 2228 is shown for loading or saving code to removable diskettes 2230 or equivalent computer readable media. The system 2200 may be implemented by combination of hardware and software.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

Referring to FIG. 22, there is shown a block diagram of the major electrical components of an information processing system 2200 in accordance with this invention. The electrical components include: a central processing unit (CPU) 2202, an Input/Output (I/O) Controller 2204, a system power and clock source 2206; display driver 2208; RAM 2210; ROM 2212; ASIC (application specific integrated circuit) 2214 and a hard disk drive 2218. a keyboard 2216 with a mouse 2232 receives the user input. Other pointing devices besides a mouse 2232 can be substituted such as a trackball, joystick, glidepad, TrackPoint, and touch screen. These are representative components of a computer. The operation of a computer comprising these elements is well understood. Network interface 2220 provides connection to a computer network such as Ethernet, TCP/IP or other popular protocol network interfaces. Optional components for interfacing to external peripherals include: a Small Computer Systems Interface (SCSI) port 2222 for attaching peripherals; a PCMCIA slot 2224; and serial port 2226. An optional diskette drive 2228 is shown for loading or saving code to removable diskettes 2230. The system 2200 may be implemented by combination of hardware and software. Moreover, the functionality required for using the invention may be embodied in computer-readable media (such as 3.5 inch diskette 2230) to be used in programming an information-processing apparatus (e.g., a personal computer) to perform in accordance with the invention.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A rotating media storage system comprising:
   a rotating disk platter that exhibits a significant disk-flutter mode characterized by a spectrum centered at approximately a first frequency, the disk-flutter mode being primarily caused by airflow-induced movement of the rotating disk platter normal to its surface;
   a read/write transducer; and
   a servo feedback loop including a first peak filter having a filter band that includes the first frequency for providing a position error signal to position the read/write transducer over the rotating disk platter.

2. The rotating media storage system according to claim 1, further comprising:
   at least one narrow band filter with a center frequency set to a frequency within the spectrum.

3. The rotating media storage system according to claim 2, wherein the narrow band filter is set to servo compensate a fundamental frequency of the significant flutter mode.

4. The rotating media storage according to claim 3, wherein the narrow band filter is set to at least one side band frequency of the significant flutter mode.

5. The rotating media storage system according to claim 2, wherein the narrow band filter is set to at least one side band frequency of the significant flutter mode.

6. The rotating media storage system according to claim 1 wherein:
   the peak filter comprises a lag-lead filter.

7. The rotating media storage system according to claim 6 wherein:
   the servo feedback loop further comprises a narrow band filter with a center frequency within the spectrum.

8. An information processing system comprising:
   a rotating disk platter;
   a read/write transducer positioned over the rotating disk platter; and
   a servo feedback loop for providing a position error signal to position the read/write transducer over the rotating disk platter, the feedback loop including at least one narrow band filter with a center frequency set to at least one disk-flutter mode, the disk-flutter mode being primarily caused by airflow-induced movement of the rotating disk platter normal to its surface.

9. An information processing system comprising:
   a rotating disk platter;
   a read/write transducer positioned over the rotating disk platter; and
   a servo feedback loop for providing a position error signal to position the read/write transducer over the rotating disk platter, the servo loop including a lag-lead filter to compensate for disk-flutter-induced disturbances on the read/write transducer, the disk-flutter being primarily caused by airflow-induced movement of the rotating disk platter normal to its surface.

10. The information processing system according to claim 9, further comprising: at least one narrow band filter with a center frequency set to at least one flutter mode.

11. A method of operating a rotating media storage system to reduce disk-flutter effects comprising the steps of:
    inducing a first disk-flutter mode characterized by a first spectrum centered at approximately a first frequency on a disk platter by rotating the disk platter, the disk-flutter mode being primarily induced by movement of the rotating disk platter normal to its surface due to airflow;
    providing a position error signal to a servo feedback loop;
    filtering the position error signal with a first peak filter; and
    positioning a read/write transducer over the disk platter based at least partially on the position error signal.

12. The method according to claim 11, further comprising the step of: filtering the position error signal with a narrow band filter with a center frequency set to the flutter mode.

13. The method according to claim 12, wherein the step of filtering further comprises filtering the position error signal with a narrow band filter set to a fundamental frequency of the flutter mode.

14. The method according to claim 12, wherein the step of filtering further comprises filtering the position error signal with a narrow band filter set to a side band frequency of the flutter mode.

15. The method according to claim 11 further comprising the step of:
    measuring the first spectrum of the flutter mode.

16. The method according to claim 15 further comprising the step of:
    setting a center frequency of the peak filter in accordance with the first spectrum.

17. The method according to claim 15 further comprising the step of:
    setting a bandwidth of the peak filter in accordance with the spectrum.

18. The method according to claim 11 wherein the step of filtering comprises the sub-step of:
    filtering the position error signal with a first peak filter that is characterized by a first center frequency that falls within the first spectrum.

19. The method according to claim 18 wherein the step of filtering comprises the sub-step of:
    filtering the position error signal with a first narrow band peak filter that is characterized by a first center frequency that falls within the first spectrum.

20. The method according to claim 19 further comprising a step of:
    filtering the position error signal with a second narrow band peak filter that is characterized by a second center frequency that falls within the first spectrum.

21. The method according to claim 18 further comprising the step of:
    inducing a second disk-flutter mode characterized by a second spectrum centered at approximately a second frequency on a disk platter by rotating the disk platter; and
    filtering the position error signal with a second peak filter that is characterized by a second center frequency that falls within the second spectrum.

22. The method according to claim 21 wherein the step of filtering the position error signal with as second peak filter comprises the sub-step of:
    filtering the position error signal with a second peak filter that is characterized by a second center frequency, a second transfer function, that falls within the second spectrum, and overlaps a first transfer function that characterizes the first peak filter, such that a phase lag caused by the first peak filter, is compensated by a phase lead caused by the second peak filter.

23. The method according to claim 11, further comprising the sub-step of:
    placing a narrow band filter set to filter out the fundamental mode of at least one flutter mode.

24. A method of operating a rotating disk storage system to reduce disk-flutter effects comprising the steps of:
    providing a position error signal to a servo feedback loop to position a read/write transducer over a rotating disk platter; and
    filtering the position error signal with a lag-lead filter in series with the servo feedback loop to compensate for disk-flutter-induced disturbances on the transducer, the disk-flutter being primarily caused by airflow-induced movement of the rotating disk platter normal to its surface.

25. The method according to claim 24, further comprising the step of:
    filtering the position error signal with at least one narrow band filter with a center frequency set to at least one flutter mode.

* * * * *